United States Patent
Hayashi et al.

(10) Patent No.: US 9,699,427 B2
(45) Date of Patent: Jul. 4, 2017

(54) IMAGING DEVICE, IMAGING METHOD, AND IMAGE PROCESSING DEVICE

(71) Applicant: FUJIFILM Corporation, Tokyo (JP)

(72) Inventors: Kenkichi Hayashi, Saitama (JP); Masahiko Sugimoto, Saitama (JP); Yousuke Naruse, Saitama (JP); Kosuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/989,611

(22) Filed: Jan. 6, 2016

(65) Prior Publication Data

US 2016/0119603 A1 Apr. 28, 2016

Related U.S. Application Data

(63) Continuation of application No. PCT/JP2014/066499, filed on Jun. 23, 2014.

(30) Foreign Application Priority Data

Aug. 1, 2013 (JP) ................................. 2013-160767

(51) Int. Cl.
*H04N 9/64* (2006.01)
*G06K 9/44* (2006.01)
(Continued)

(52) U.S. Cl.
CPC ............... *H04N 9/646* (2013.01); *G06K 9/44* (2013.01); *G06T 5/003* (2013.01); *G06T 5/30* (2013.01);
(Continued)

(58) Field of Classification Search
None
See application file for complete search history.

(56) References Cited

U.S. PATENT DOCUMENTS

| 2002/0101531 A1 | 8/2002 | Kaneda |
| 2004/0141086 A1 | 7/2004 | Mihara |

(Continued)

FOREIGN PATENT DOCUMENTS

| JP | 2002-190981 A | 7/2002 |
| JP | 2004-219569 A | 8/2004 |

(Continued)

OTHER PUBLICATIONS

International Preliminary Report on Patentability for PCT/JP2014/066499 mailed on Nov. 17, 2015.
(Continued)

*Primary Examiner* — Timothy J Henn
(74) *Attorney, Agent, or Firm* — Birch, Stewart, Kolasch & Birch, LLP

(57) ABSTRACT

An imaging device 10 according to an aspect of the present invention includes: an image generation section 100 that generates a moving image; a filter acquisition section 105 that acquires a restoration filter corresponding to a transfer function for the point distribution of an optical system; an aperture value detection section 110 that detects an aperture value of the optical system; a restoration processing determination section 115 that determines whether or not the aperture value detected by the aperture value detection section 110 is equal to or greater than a small-aperture-blurring reference aperture value; and a restoration processing execution section 120 that executes the restoration processing on the moving image through the restoration filter, in case where the restoration processing determination section 115 determines that the aperture value detected by the aperture value detection section 110 is equal to or greater than the small-aperture-blurring reference aperture value.

15 Claims, 21 Drawing Sheets

(51) Int. Cl.
    G06T 5/00     (2006.01)
    G06T 5/30     (2006.01)
    G06T 7/20     (2017.01)
    H04N 5/208    (2006.01)
    H04N 5/217    (2011.01)
    H04N 5/225    (2006.01)
    H04N 5/232    (2006.01)
    H04N 5/238    (2006.01)
    H04N 5/357    (2011.01)

(52) U.S. Cl.
    CPC .............. *G06T 7/20* (2013.01); *H04N 5/208* (2013.01); *H04N 5/217* (2013.01); *H04N 5/2254* (2013.01); *H04N 5/238* (2013.01); *H04N 5/23209* (2013.01); *H04N 5/23229* (2013.01); *H04N 5/3572* (2013.01); *G06T 2207/20024* (2013.01); *G06T 2207/20182* (2013.01); *G06T 2207/20201* (2013.01)

(56) References Cited

U.S. PATENT DOCUMENTS

| | | |
|---|---|---|
| 2007/0248349 A1 | 10/2007 | Nanjo |
| 2010/0053350 A1 | 3/2010 | Miyauchi et al. |
| 2010/0079627 A1 | 4/2010 | Ono |
| 2011/0193997 A1* | 8/2011 | Hatakeyama ........ H04N 5/3572 348/241 |
| 2011/0285879 A1* | 11/2011 | Hatakeyama ........... G06T 5/003 348/241 |
| 2013/0010158 A1 | 1/2013 | Watanabe |
| 2013/0342732 A1* | 12/2013 | Yokoyama ............. H04N 5/907 348/231.99 |
| 2014/0218557 A1* | 8/2014 | Ebe ....................... H04N 5/2351 348/222.1 |
| 2015/0296138 A1* | 10/2015 | Hatakeyama ...... H04N 5/23235 348/241 |
| 2016/0005151 A1* | 1/2016 | Hatakeyama ............. G06T 5/20 348/241 |
| 2016/0065924 A1* | 3/2016 | Yokoyama ............. H04N 5/232 348/241 |

FOREIGN PATENT DOCUMENTS

| | | |
|---|---|---|
| JP | 2007-292828 A | 11/2007 |
| JP | 2008-11492 A | 1/2008 |
| JP | 2008-227839 A | 9/2008 |
| JP | 2008-245265 A | 10/2008 |
| JP | 2009-282551 A | 12/2009 |
| JP | 2010-87862 A | 4/2010 |
| JP | 2012-65114 A | 3/2012 |
| JP | 2013-16008 A | 1/2013 |

OTHER PUBLICATIONS

International Search Report for PCT/JP2014/066499 mailed on Sep. 16, 2014.
Written Opinion of the International Preliminary Examining Authority for PCT/JP2014/066499 mailed on Aug. 25, 2015.
Written Opinion of the International Searching Authority for PCT/JP2014/066499 mailed on Sep. 16, 2014.
International Preliminary Report on patentability for PCT/JP2014/066499 mailed on Nov. 4, 2015, with an English Translation thereof.

* cited by examiner

FIG. 7A    FIG. 7B    FIG. 7C    FIG. 7D
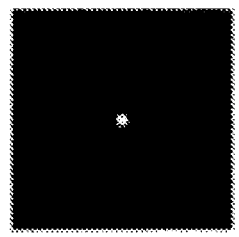 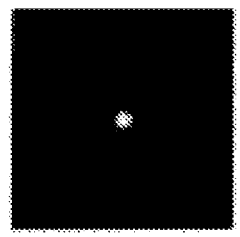 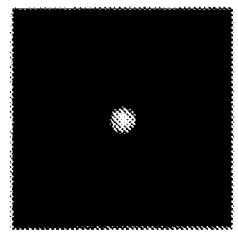 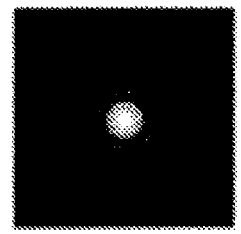
F2    F2.8    F4    F5.6
FIG. 7E    FIG. 7F    FIG. 7G
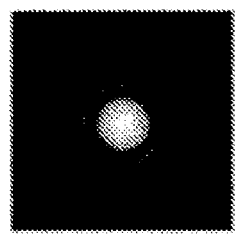 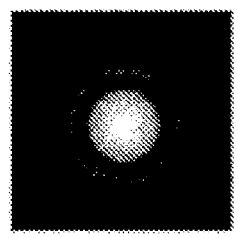 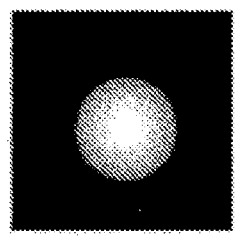
F8    F11    F16

IMAGING DEVICE, IMAGING METHOD, AND IMAGE PROCESSING DEVICE

CROSS-REFERENCE TO RELATED APPLICATIONS

This application is a Continuation of PCT International Application No. PCT/JP2014/066499 filed on Jun. 23, 2014, which claims priority under 35 U.S.C §119(a) to Patent Application No. 2013-160767 filed in Japan on Aug. 1, 2013, all of which are hereby expressly incorporated by reference into the present application.

BACKGROUND OF THE INVENTION

1. Field of the Invention

The present invention relates to an imaging device, an imaging method, and an image processing device. In particular, the present invention relates to an imaging device, an imaging method, and an image processing device capable of performing restoration processing based on a point spread function.

2. Description of the Related Art

On an image of a subject photographed through an optical imaging system, sometimes, a so-called point spread phenomenon may be observed. The point spread phenomenon is a phenomenon that a point subject is slightly enlarged by an effect such as aberration or diffraction caused by the optical imaging system. A function, which indicates a response to a point light source of the optical system, is referred to as a point spread function (PSF). This function is known as a parameter having an influence on resolution degradation (blurring) of a photographed image.

A photographed image, of which image quality is lowered due to the point spread phenomenon, is subjected to restoration processing (point image restoration processing) based on the PSF, and thereby image quality of the image can be restored. The point image restoration processing is processing of acquiring degradation characteristics (point image characteristics), which are caused by aberration and the like of the lens (optical system), in advance and canceling out the point spread of the photographed image through image processing using a restoration filter corresponding to the point image characteristics.

There have been proposed various techniques of the point image restoration processing. For example, JP2010-087862A discloses an image processing device capable of appropriately restoring a subject image even when a subject distance is unclear. The image processing device performs correction processing on an image in accordance with a degree of opening of an aperture stop of an aperture stop section provided in the optical system, by using dependency of the optical transfer function of the optical system on the degree of opening of the aperture stop.

JP2012-065114A discloses an imaging device capable of extending a depth of field without causing artifacts by minimizing processing time periods for positioning, synthesis, and the like. The imaging device calculates the PSF on the basis of a plurality of aperture values and the like so as to design a plurality of filters, and performs filter processing.

JP2008-245265A discloses an imaging device capable of easily detecting a resolution peak position, performing blurring processing for achieving favorable restoration, simplifying an optical system, reducing costs, suppressing the noise effect, and the like in a depth extension optical system. In the imaging device, filter processing corresponding to aperture stop information is performed.

In contrast, as an aperture of an aperture stop of the optical system becomes smaller, blurring in the photographed image, that is, small-aperture blurring gradually becomes more noticeable due to the light diffraction phenomenon. From the viewpoint of providing a high quality image, it is preferable to eliminate an effect of the small-aperture blurring that lowers the image resolution as much as possible, and there have been proposed various techniques of improving image quality by suppressing the effect of the small-aperture blurring.

For example, JP2007-292828A discloses a light amount adjustment device that avoids small aperture diffraction of an aperture stop. In the light amount adjustment device, two filter members, which have gradation ND regions where a transmittance continuously changes, are arranged such that the members face each other and shading change directions thereof are opposite, and are configured to be symmetrically movable.

JP2009-282551A discloses an imaging device in which light amount adjustment means provided in a photography lens device adjusts a light amount to a range where small aperture diffraction does not occur. The imaging device receives MTF characteristic data from the mounted photography lens device, and has control means for setting a utilization F number limit at which the small aperture diffraction occurs.

SUMMARY OF THE INVENTION

However, in the technologies disclosed in JP2010-087862A, JP2012-065114A, and JP2008-245265A, contents of the restoration processing and the restoration filter are changed for each of all aperture values. Therefore, the restoration filter has to be acquired in accordance with each aperture value, and thus a processing load of the image processing circuit increases, and the circuit size also increases. Further, in the technologies disclosed in JP2010-087862A, JP2012-065114A, and JP2008-245265A, the restoration processing is performed on even an image which has not been sufficiently restored even when the restoration processing has been performed, and thus the processing is not necessarily effective in terms of an amount of calculation of the restoration processing.

JP2007-292828A and JP2009-282551A do not disclose and do not describe a method of coping with small-aperture blurring through the restoration processing.

When the restoration processing is performed on a moving image, there are peculiar problems as described below.

When a moving image is photographed, a subject may move or the imaging device may move in the process of photography. In this case, a desired subject may not be in focus (may be defocused) in the process of photography. Further, while the moving image is being photographed until an in-focus state is achieved at an appropriate in-focus position, a region (defocus region) where the focus is not on the desired subject occurs. When the restoration processing is performed on the defocus region, image quality may be instead degraded by overcorrection and the like. Furthermore, while the imaging device is activating until an in-focus state is achieved at an appropriate in-focus position, when the restoration filter is sequentially changed in accordance with the in-focus position, the processing load of the image processing circuit increases, and the circuit size also increases.

When a still image is photographed, a general imaging device detects and determines photography conditions by performing a photography preparation operation in response to an operation of half pressing of the shutter release button. However, when a moving image is photographed, there is a time period in which the photography conditions are not set, for example, a first rising edge time period of several seconds immediately after start of the moving image photography. In the restoration processing performed in the time period, the photography conditions are not set, and thus it is difficult to select a restoration filter appropriate for the photography conditions. Accordingly, when an inappropriate restoration filter is used, image quality may be instead degraded.

JP2010-087862A, JP2012-065114A, JP2008-245265A, JP2007-292828A, and JP2009-282551A do not disclose and do not describe a method of coping with problems which may arise when the restoration processing is performed on the above-mentioned moving image.

The present invention has been made in view of the above-mentioned situation. The present invention provides a technology of reducing the processing load of circuits and improving image quality through the effective restoration processing by performing the restoration processing on only a moving image or a still image for which it can be expected that the restoration processing will be sufficiently effective in terms of a relationship between the restoration processing and an aperture value at which small-aperture blurring is dominant in image degradation. Further, the present invention provides a technology of suppressing degradation in image quality of the generated moving image when the restoration processing is performed on a moving image which has a defocus region and a moving image which is photographed in a state where the photography conditions are not set.

According to an aspect of the present invention, there is provided an imaging device including: an imaging section that captures an image of a subject through an optical system and generates image data; an image generation section that generates a moving image on the basis of the image data; a filter acquisition section that acquires a restoration filter corresponding to a transfer function for point distribution of the optical system; an aperture value detection section that detects an aperture value of the optical system when the imaging section captures the image of the subject; a restoration processing determination section that determines whether or not the aperture value detected by the aperture value detection section is equal to or greater than a small-aperture-blurring reference aperture value; and a restoration processing execution section that executes the restoration processing on the moving image through the restoration filter, in case where the restoration processing determination section determines that the aperture value detected by the aperture value detection section is equal to or greater than the small-aperture-blurring reference aperture value.

In the present aspect, the restoration processing is performed on only the moving image which is captured at the aperture value equal to or greater than the small-aperture-blurring reference aperture value. Hence, by setting the small-aperture-blurring reference aperture value on the basis of an effect of image quality improvement obtained through the restoration processing, the restoration processing is performed on only the image for which it can be expected that the restoration processing is sufficiently effective. As a result, it is possible to reduce the processing load of the image processing circuit and to effectively improve image quality through the restoration processing.

It should be noted that the "aperture value" indicates a degree of opening of an aperture stop which is provided in the optical system so as to adjust a light amount. In particular, in the present aspect, as the aperture value increases, this means that an amount of blocked light increases. For example, the aperture value can be represented by an F number.

Further, the "small-aperture-blurring reference aperture value" can be set on the basis of the effect of image quality improvement obtained through the restoration processing. For example, an aperture value, at which the effect of the small-aperture blurring on the moving image is dominant, can be set as the small-aperture-blurring reference aperture value.

According to another aspect of the present invention, there is provided an imaging device including: an imaging section that captures an image of a subject through an optical system and generates image data; an image generation section that generates a moving image subjected to thinning-out processing on the basis of the image data; a filter acquisition section that acquires a restoration filter corresponding to a transfer function for point distribution of the optical system; an aperture value detection section that detects an aperture value of the optical system when the imaging section captures the image of the subject; a restoration processing determination section that determines whether or not the aperture value detected by the aperture value detection section is a distortion-suppression aperture value as an aperture value corresponding to small-aperture blurring which suppresses aliasing distortion caused when the thinning-out processing is performed; and a restoration processing execution section that executes the restoration processing on the moving image, which is subjected to the thinning-out processing, through the restoration filter, in case where the restoration processing determination section determines that the aperture value detected by the aperture value detection section is the distortion-suppression aperture value.

In the present aspect, the restoration processing is performed on only a moving image captured at "the distortion-suppression aperture value corresponding to the small-aperture blurring which suppresses aliasing distortion caused when the thinning-out processing is performed". Hence, it is possible to perform the restoration processing on only the moving image for which it can be expected that the restoration processing is sufficiently effective. As a result, it is possible to reduce the processing load of the image processing circuit and to effectively improve image quality through the restoration processing.

In the present aspect, the restoration processing is performed only on the moving image which is less affected by aliasing distortion occurring in the thinned-out moving image. Therefore, it is possible to prevent image quality from being instead degraded through the restoration processing.

It should be noted that the "distortion-suppression aperture value" means an aperture value at which small-aperture blurring to the extent that the effect of aliasing distortion can be reduced occurs.

Preferably, the restoration processing execution section adjusts a restoration strength of the restoration processing in accordance with the aperture value detected by the aperture value detection section, and executes the restoration processing.

In the present aspect, when the restoration processing is performed, the restoration strength of the restoration processing is adjusted in accordance with the aperture value. Therefore, it is possible to perform appropriate restoration processing on the basis of the aperture value at which the moving image is captured.

Preferably, the image generation section further generates a still image on the basis of the image data. Preferably, when determining whether or not to perform the restoration processing on the still image, the restoration processing determination section determines whether or not to perform the restoration processing on the still image, on the basis of a still-image reference aperture value as an aperture value which is less than the small-aperture-blurring reference aperture value. Preferably, the restoration processing execution section executes the restoration processing on the still image through the restoration filter in case where the restoration processing determination section determines that the aperture value detected by the aperture value detection section is equal to or greater than the still-image reference aperture value.

In the present aspect, the restoration processing is performed on the moving image in accordance with the small-aperture-blurring reference aperture value, and the restoration processing is performed on the still image in accordance with the still-image reference aperture value. Therefore, it is possible to satisfy an image quality required for each of the moving image and the still image.

In the case of the moving image, the restoration processing is performed on the moving image which is photographed at the aperture value equal to or greater than the small-aperture-blurring reference aperture value. In the case of the still image, the restoration processing is performed on the still image which is photographed at the aperture value equal to or greater than the still-image reference aperture value. Consequently, in the present aspect, it is possible to reduce the processing load of the circuits used in the image processing, and it is possible to effectively improve image quality through the restoration processing.

It should be noted that the "still-image reference aperture value" may be set in terms of performing the restoration processing on the still image at the aperture value which is in a range larger than that of the moving image. Here, the still-image reference aperture value is defined as an open-side aperture value less than the distortion-suppression aperture value. For example, the still-image reference aperture value may be an aperture value closer to the open side by at least one stop than the small-aperture-blurring reference aperture value. It should be noted that "one stop" means one step in stepwise adjustment of the aperture stop.

Preferably, the image generation section further generates a still image on the basis of the image data. Preferably, when determining whether or not to perform the restoration processing on the still image, the restoration processing determination section determines whether or not to perform the restoration processing on the still image, on the basis of a still-image reference aperture value as an aperture value which is less than the distortion-suppression aperture value closest to an open side among the distortion-suppression aperture values. Preferably, the restoration processing execution section executes the restoration processing on the still image through the restoration filter in case where the restoration processing determination section determines that the aperture value detected by the aperture value detection section is equal to or greater than the still-image reference aperture value.

In the present aspect, the restoration processing is performed on the moving image in accordance with the distortion-suppression aperture value, and the restoration processing is performed on the still image in accordance with the still-image reference aperture value. Therefore, it is possible to satisfy an image quality required for each of the moving image and the still image.

In the case of the moving image, the restoration processing is performed on the moving image which is photographed at the distortion-suppression aperture value. In the case of the still image, the restoration processing is performed on the still image which is photographed at the aperture value equal to or greater than the still-image reference aperture value. Consequently, in the present aspect, it is possible to reduce the processing load of the circuits used in the image processing, and it is possible to effectively improve image quality through the restoration processing.

It should be noted that the "still-image reference aperture value" may be set in terms of performing the restoration processing on the still image at the aperture value which is in a range larger than that of the moving image. For example, the still-image reference aperture value may be an aperture value closer to the open side by at least one stop than the distortion-suppression aperture value closest to the open side when there is a plurality of distortion-suppression aperture values, and may be an aperture value closer to the open side by at least one stop than the distortion-suppression aperture value when there is one distortion-suppression aperture value. It should be noted that "one stop" means one step in stepwise adjustment of the aperture stop. Further, the still-image reference aperture value is an open-side aperture value which is less than the distortion-suppression aperture value closest to the open side when there is a plurality of distortion-suppression aperture values, and is an open-side aperture value which is less than the distortion-suppression aperture value when there is one distortion-suppression aperture value.

Preferably, when performing the restoration processing on the moving image, the restoration processing execution section performs the restoration processing by adjusting the restoration strength of the restoration processing to a strength lower than that in the case where the restoration processing is performed on the still image.

In the present aspect, the restoration strength of the restoration processing for the moving image is weaker than the restoration strength of the restoration processing for the still image. Image quality of the moving image, in which the subject moves, is likely to be instead degraded through the restoration processing. However, in the present aspect, it is possible to reduce degradation in image quality.

Preferably, the filter acquisition section acquires a restoration filter for the moving image when the restoration processing is performed on the moving image, and acquires a restoration filter for the still image when the restoration processing is performed on the still image. Preferably, the restoration processing execution section executes the restoration processing through the restoration filter for the moving image when performing the restoration processing on the moving image, and executes the restoration processing through the restoration filter for the still image when performing the restoration processing on the still image.

In the present aspect, the moving image is restored through the restoration filter for the moving image, and the still image is restored through the restoration filter for the still image. Accordingly, it is possible to perform the restoration processing appropriate for each of the moving image and the still image, and it is possible to satisfy the demand for image quality of each of the moving image and the still image.

Preferably, the filter acquisition section acquires a restoration filter for the still image when the restoration processing is performed on the moving image, and acquires a restoration filter for the still image when the restoration processing is performed on the still image. Preferably, the restoration processing execution section executes the restoration processing through the restoration filter for the still image when performing the restoration processing on the moving image, and executes the restoration processing through the restoration filter for the still image when performing the restoration processing on the still image.

In the present aspect, the moving image and the still image are subjected to the restoration processing based on the restoration filter for the still image. Accordingly, it is possible to minimize a storage volume for the restoration filters, or it is possible to reduce a calculation load in calculation of the restoration filters.

Preferably, a filter size of the restoration filter for the moving image is smaller than a filter size of the restoration filter for the still image.

In the present aspect, the moving image is restored through the restoration filter for the moving image of which the filter size is smaller than the filter size of the restoration filter for the still image. Hence, it is possible to perform the restoration processing appropriate for the moving image, and it is possible to satisfy the demand for image quality of the moving image.

Preferably, the restoration processing execution section performs the restoration processing of correcting only an amplitude component of the transfer function for the point distribution of the optical system when the restoration processing is performed on the moving image.

In the present aspect, the restoration processing is performed on only the amplitude component of the transfer function for the point distribution of the optical system. Thereby, it is possible to achieve an image quality required for the moving image or the still image, and it is possible to reduce the sizes of circuits for the restoration processing.

Preferably, the aperture value detection section detects the aperture value on the basis of a luminance which is obtained from the moving image at beginning of capturing the image of the subject through the imaging section.

In the present aspect, in an initial step of image capturing, the aperture value is detected on the basis of the luminance of the captured moving image. Accordingly, even in the initial step of image capturing, it is possible to appropriately detect the aperture value.

Preferably, the filter acquisition section acquires a restoration filter which is generated corresponding to the transfer function for the point distribution of the optical system, on the basis of an aperture value which is closer to a small-aperture side than the aperture value detected by the aperture value detection section.

In the present aspect, in the initial step of the image capturing, the restoration filter is acquired on the basis of the aperture value which is closer to a small-aperture side than the detected aperture value. Therefore, even in the initial step of the image capturing, it is possible to prevent image quality from being instead degraded through the restoration processing.

Preferably, the restoration processing execution section executes the restoration processing after the subject is brought into focus at the beginning of generating the moving image through the imaging section.

When the restoration processing is performed on a defocused image, image quality may be instead degraded. However, in the present aspect, in the initial step of the image capturing, after waiting until the subject is in focus, the restoration processing is performed. Thereby, since the image to be subjected to the restoration processing is in the in-focus state, it is possible to prevent image quality from being instead degraded through the restoration processing.

Preferably, the optical system is an interchangeable type.

In the interchangeable-type optical system according to the present aspect, even when the characteristics of the optical system change, it is possible to perform appropriate restoration processing in which degradation in image quality is suppressed.

Preferably, the optical system has a lens that extends a depth of field by modulating a phase.

In the present aspect, the restoration processing, in which degradation in image quality is suppressed, may be also performed on original image data which is obtained through a so-called extended depth of field (EDoF (Focus)) optical system. In addition, a technique (optical phase modulation means) of modulating the phase in the lens section is not particularly limited, and a phase modulation section may be provided between lenses, or a lens itself (for example, a lens incident surface and/or output surface) may have a phase modulation function.

According to still another aspect of the present invention, there is provided an imaging method including: an imaging step of capturing an image of a subject through an optical system and generating image data; an image generation step of generating a moving image on the basis of the image data; a filter acquisition step of acquiring a restoration filter corresponding to a transfer function for point distribution of the optical system; an aperture value detection step of detecting an aperture value of the optical system when the image of the subject is captured in the imaging step; a restoration processing determination step of determining whether or not the aperture value detected in the aperture value detection step is equal to or greater than a small-aperture-blurring reference aperture value; and a restoration processing execution step of executing the restoration processing on the moving image through the restoration filter, in case where it is determined through the restoration processing determination step that the aperture value detected in the aperture value detection step is equal to or greater than the small-aperture-blurring reference aperture value.

According to still another aspect of the present invention, there is provided an imaging method including: an imaging step of capturing an image of a subject through an optical system and generating image data; an image generation step of generating a moving image subjected to thinning-out processing on the basis of the image data; a filter acquisition step of acquiring a restoration filter corresponding to a transfer function for point distribution of the optical system; an aperture value detection step of detecting an aperture value of the optical system when the image of the subject is captured in the imaging step; a restoration processing determination step of determining whether or not the aperture value detected in the aperture value detection step is a distortion-suppression aperture value as an aperture value corresponding to small-aperture blurring which suppresses aliasing distortion caused when the thinning-out processing is performed; and a restoration processing execution step of executing the restoration processing on the moving image, which is subjected to the thinning-out processing, through the restoration filter, in case where it is determined through the restoration processing determination step that the aperture value detected in the aperture value detection step is the distortion-suppression aperture value.

Further, according to still another aspect of the present invention, there is provided an image processing device including: an image acquisition section that acquires a moving image based on image data which is acquired by capturing an image of a subject through an optical system; a filter acquisition section that acquires a restoration filter corresponding to a transfer function for point distribution of the optical system; an aperture value acquisition section that acquires an aperture value of the optical system when the image of the subject is captured; a restoration processing determination section that determines whether or not the aperture value acquired by the aperture value acquisition section is equal to or greater than a small-aperture-blurring reference aperture value; and a restoration processing execution section that executes the restoration processing on the moving image through the restoration filter, in case where the restoration processing determination section determines that the aperture value acquired by the aperture value acquisition section is equal to or greater than the small-aperture-blurring reference aperture value. Further, preferably, the aperture value acquisition section acquires the aperture value of the optical system, which is recorded in the image data, from the image data.

According to the aspects of the present invention, the restoration processing is performed on only the images for which the restoration processing is relatively effective. Accordingly, it is possible to reduce the processing load of the image processing circuits, and it is possible to prevent image quality of the moving image from being instead degraded through the restoration processing by effectively improving the image quality through the restoration processing.

BRIEF DESCRIPTION OF THE DRAWINGS

FIGS. 7A to 7G are diagrams illustrating a relationship between an aperture stop and diffraction blurring.

DESCRIPTION OF THE PREFERRED EMBODIMENTS

Referring to accompanying drawings, embodiments of the present invention will be described. In the following description, an example, in which the present invention is applied to a digital camera 10 (imaging device) connectable to a computer (PC: personal computer) 60 will be given.

In the following example, an interchangeable-lens digital camera 10, in which an optical system 12 and a camera main body 14 separately formed are assembled, will be described. However, the same image restoration processing can be performed on even a fixed-lens digital camera 10 having the optical system 12 and the camera main body 14 integrated as one body. Further, the digital camera 10 may be a video camera which has a main function of moving image photography, and may be an imaging device capable of photographing both a still image and a moving image.

Figure 1:
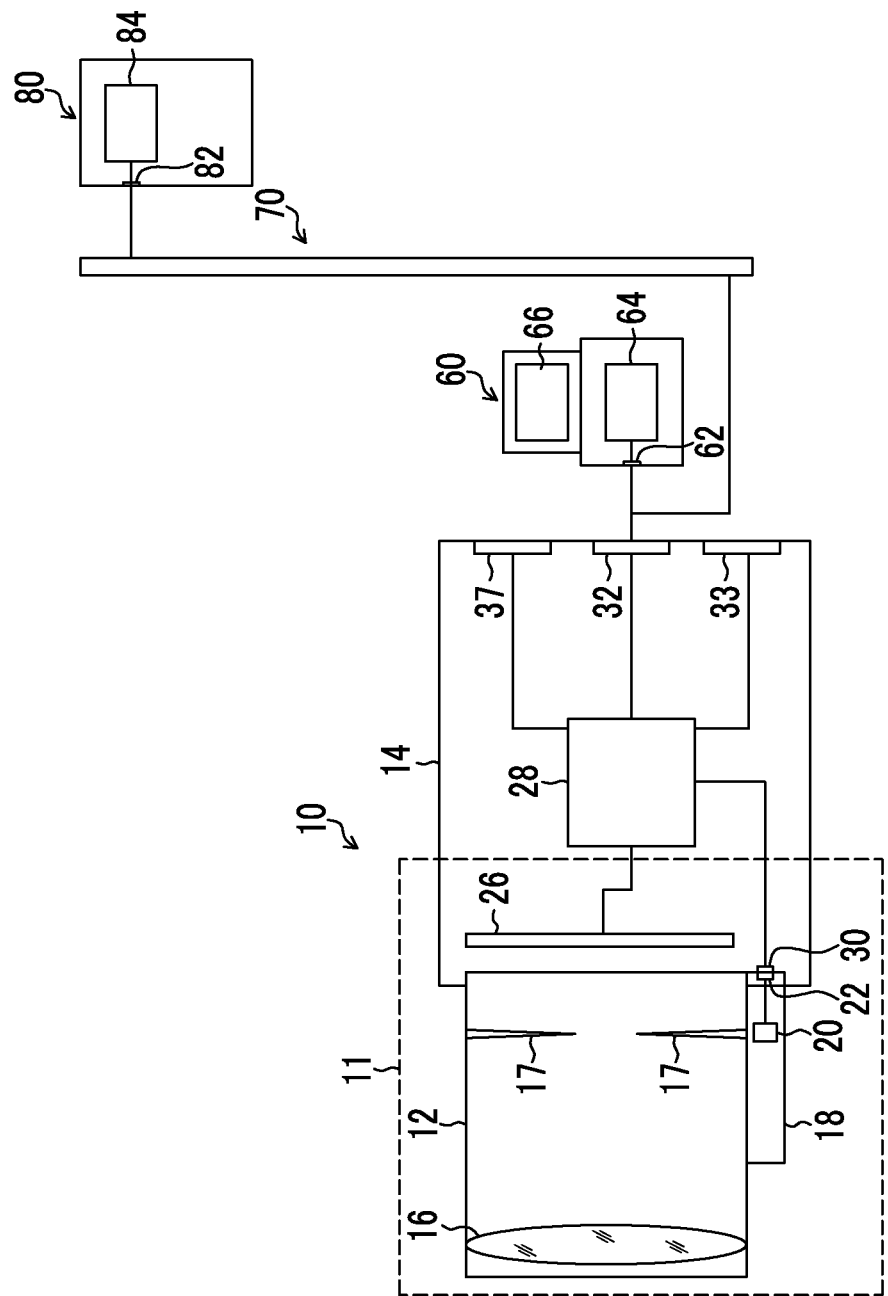
FIG. 1 is a block diagram illustrating a brief overview of a digital camera which is connected to a computer.

FIG. 1 is a block diagram illustrating a brief overview of the digital camera 10 connected to the computer 60.

The digital camera 10 includes the interchangeable optical system 12, and the camera main body 14 having an imaging element 26. The digital camera 10 is electrically connected to the optical system 12 and the camera main body 14 through an optical system input/output section 22 of the optical system 12 and a camera main body input/output section 30 of the camera main body 14.

The optical system 12 includes optical members such as a lens 16 and an aperture stop 17 and an optical system operation section 18 that controls the optical members. The optical system operation section 18 includes: an optical system controller 20 that is connected to the optical system input/output section 22; and an actuator (not shown in the drawing) that operates the optical members. The optical system controller 20 controls the optical members through the actuator on the basis of a control signal which is sent from the camera main body 14 through the optical system input/output section 22, and performs, for example, focus control and zoom control based on lens movement and aperture amount control of the aperture stop 17.

Accordingly, the imaging section 11 of the digital camera 10 includes the optical system 12 and the imaging element 26, and generates image data of a subject image, which is captured by the optical system 12, in the imaging element 26. Then, the image generation section generates a moving image on the basis of the image data. Here, the moving image may be a plurality of successive images, and is defined to include, for example, a recorded moving image, a live view image, and successively photographed images in a continuous shooting mode.

In the imaging device 10, recording of a moving image is started when a video imaging mode is selected as the photography mode through a user interface 37 and the shutter button (not shown in the drawing) included in the user interface 37 is "pressed fully", and the recording stops and remains on standby when the shutter button is "pressed fully" again.

When the video imaging mode is selected, an auto focus control section (not shown in the drawing) included in a device control section 34 continuously performs focus adjustment through the optical system controller 20, and an automatic exposure control section (not shown in the drawing) included in the device control section 34 performs automatic exposure control (AE). In addition, as the auto focus adjustment (AF) based on the auto focus control section, it is possible to use heretofore known modes such as a phase difference AF mode and a contrast AF mode.

In contrast, in the imaging device 10, a photography preparation operation to perform AF/AE control is performed when a still image photography mode is selected as the photography mode and the shutter button is "pressed halfway", and image capturing and recording of a still image are performed when the shutter button is "pressed fully".

For example, in some imaging devices such as a portable imaging device like a smartphone to be described later, the photography preparation instruction section and the image recording instruction section are not limited to a stroke-type switch that operates in a manner of having two steps which are "pressing halfway" and "pressing fully" like the shutter button. Each instruction section may be a section that has a function of receiving the photography preparation instruction or a function of receiving the image recording instruction. In addition, the instruction section may have other buttons, may have another section for receiving touch input operations, and may be configured to receive a photography preparation instruction or an image recording instruction through a sound input, a gaze input, or the like.

The imaging element 26 has a light concentration microlens, color filters of RGB or the like, and an image sensor (a photodiode; a complementary metal oxide semiconductor (CMOS), a charge coupled device (CCD) or the like). The imaging element 26 converts light of the subject image, which is captured by the optical system 12, into an electrical signal, and sends an image signal (original image data) to a camera main body controller 28.

As described above, the imaging element 26 outputs the original image data obtained through photography using the optical system 12, and transmits the original image data to an image processing device of the camera main body controller 28. In addition, the original image data, which is generated by the imaging element 26, includes a plurality of successive images of the subject.

Figure 2:
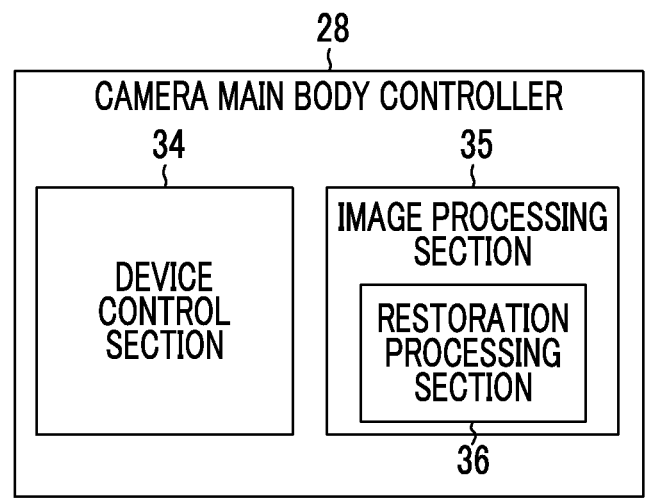
FIG. 2 is a block diagram illustrating a function configuration example of a camera main body controller.

The camera main body controller 28 integrally controls the camera main body 14, and has the device control section 34 and an image processing section (image processing device) 35, as shown in FIG. 2. The device control section 34 controls, for example, the output of the image signal (image data) sent from the imaging element 26, generates the control signal for controlling the optical system 12, transmits the signal to the optical system 12 (optical system controller 20) through the camera main body input/output section 30, and transmits image data (RAW data, JPEG data, and the like) before and after the image processing to external devices (the computer 60 and the like) connected through an input/output interface 32. Further, the device control section 34 appropriately controls various kinds of devices such as a display section 33 (EVF: electronic viewfinder, rear-side liquid crystal display section) provided in the digital camera 10.

In contrast, the image processing section 35 performs arbitrary image processing on the image signal which is sent from the imaging element 26, as necessary. For example, the image processing section 35 appropriately performs various kinds of image processing such as sensor correction processing, demosaic (synchronization) processing, pixel interpolation processing, color correction processing (offset correction processing, white balance processing, color matrix processing, gamma conversion processing, and the like), RGB image processing (sharpness processing, tone correction processing, exposure correction processing, outline correction processing, and the like), RGB/YCrCb conversion processing, and image compression processing. In addition, the image processing section 35 of the present example includes a restoration processing section 36 that performs the restoration processing (point image restoration processing), which is based on the point spread function of the optical system 12, on the image signal (original image data). The restoration processing will be described in detail.

The digital camera 10 shown in FIG. 1 is provided with other members (shutter and the like) necessary for photography and the like. With such a configuration, a user is able to appropriately determine and change various kinds of setting for the photography and the like through the user interface 37 which is provided on the camera main body 14. The user interface 37 is connected to the camera main body controller 28 (the device control section 34 and the image processing section 35), whereby various kinds of setting determined and changed by a user's command is reflected in various kinds of processing in the camera main body controller 28.

The image data, which is subjected to the image processing in the camera main body controller 28, is sent to the computer 60, which is connected to the input/output interface 32, and the like. A format of the image data, which is sent from the digital camera 10 (camera main body controller 28) to the computer 60, is not particularly limited, and may be an arbitrary format such as RAW, JPEG, or TIFF. Consequently, the camera main body controller 28 may associate a plurality of related data pieces with each other so as to form a single image file, and may transmit the image file to the computer 60. The related data pieces include, like so-called exchangeable image file format (Exif), header information (photography information (photography date and time, a device type, a pixel number, an aperture value, and the like) and the like), main image data, and thumbnail image data, and the like.

The computer 60 is connected to the digital camera 10 through the input/output interface 32 and a computer input/output section 62 of the camera main body 14, and receives some sort of data such as image data which is sent from the camera main body 14. A computer controller 64 integrally controls the computer 60 such that it performs image processing on the image data sent from the digital camera 10, and performs communication control to communicate with a server 80 which is connected to the computer input/output section 62 through network lines such as the Internet 70. The computer 60 has a display 66, and the display 66 displays processing contents in the computer controller 64 on the display 66 as necessary. A user may control the computer 60 and control devices (the digital camera 10, or the server 80) connected to the computer 60 by operating input means (not shown in the drawing) such as a keyboard and the like while checking a display of the display 66 so as to input data or a command to the computer controller 64.

The server 80 has a server input/output section 82 and a server controller 84. The server input/output section 82 constitutes a connection section for transmission to and reception from external devices such as the computer 60, and is connected to the computer input/output section 62 of the computer 60 through network lines such as the Internet 70. The server controller 84 transmits and receives some sort of data to and from the computer controller 64 as necessary, and downloads some sort of data to the computer 60 or performs calculation processing and transmits the calculation results to the computer 60, in cooperation with the computer controller 64 in response to a control instruction signal which is sent from the computer 60.

Each controller (the optical system controller 20, the camera main body controller 28, the computer controller 64, and the server controller 84) includes circuits necessary for control processing. For example, the controllers include a calculation processing circuit (CPU or the like), a memory, and the like. Further, communication between the digital camera 10, the computer 60, and the server 80 may be performed through wired or wireless connection. Furthermore, the computer 60 and the server 80 may be integrally formed, and the computer 60 and/or the server 80 may be omitted. In addition, by making the digital camera 10 have a function of communicating with the server 80, some sort of data may be directly transmitted and received between the digital camera 10 and the server 80.

Next, the restoration processing of captured image data (image data) of a subject image, which is obtained through the imaging element 26, will be described.

The present example will describe an example in which the restoration processing is performed in the camera main body 14 (camera main body controller 28). However, all or a part of the restoration processing may be performed in another controller (the optical system controller 20, the computer controller 64, the server controller 84, or the like).

The restoration processing is processing of acquiring restored image data by performing the restoration processing on the original image data, which is acquired from the imaging element 26 through photography using the optical system 12, through the restoration filter based on the point spread function of the optical system 12.

Figure 3:
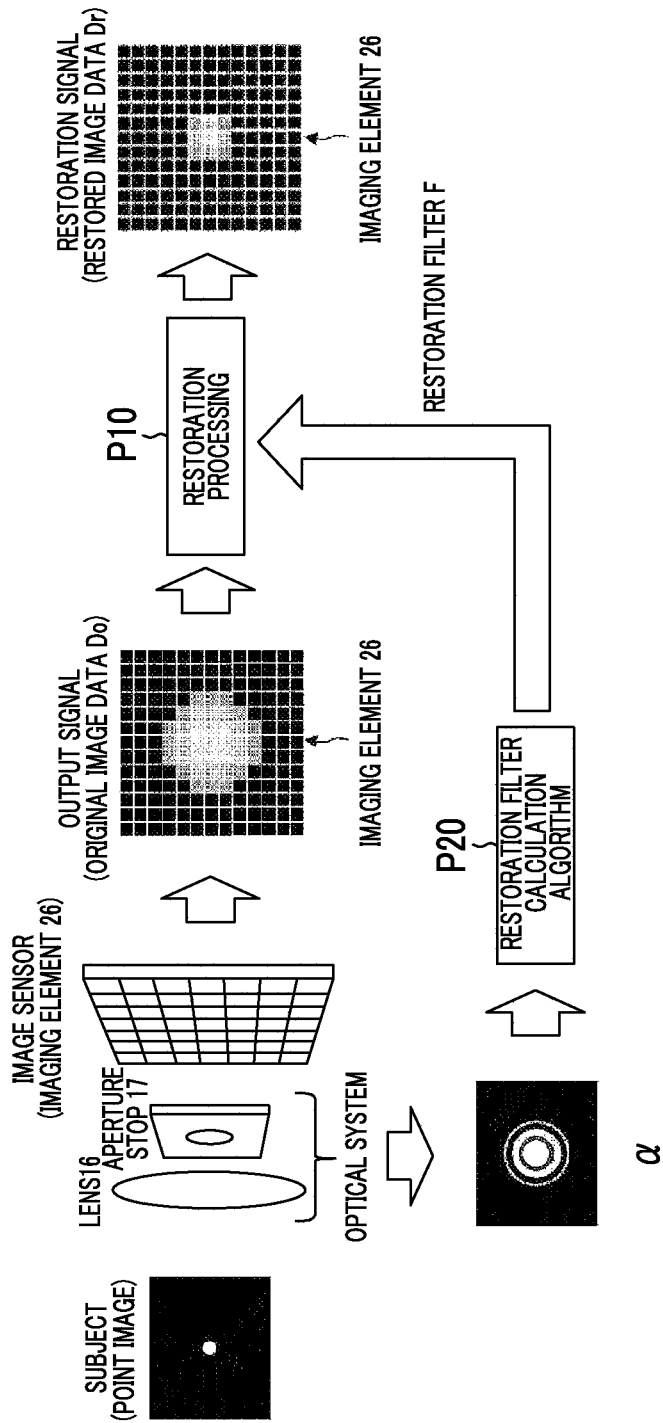
FIG. 3 is a diagram illustrating a brief overview from image photography to restoration processing.

FIG. 3 is a diagram illustrating a brief overview from the image photography to the restoration processing. When the point image is photographed as a subject, the imaging element 26 (image sensor) receives the subject image through the optical system 12, and the imaging element 26 outputs the original image data Do. The original image data Do is image data of an original subject image which is blurred due to the point spread phenomenon caused by characteristics of the optical system 12.

The original subject image (point image) is restored from the original image data Do of the blurred image. Accordingly, by performing restoration processing P10 on the original image data Do through a restoration filter F, it is possible to obtain restored image data Dr which indicates an image (restored image) closer to the original subject image (point image).

The restoration filter F used in the restoration processing P10 can be obtained using a predetermined restoration filter calculation algorithm P20 from point image information (point spread function) of the optical system 12 corresponding to the photography conditions at the time of acquiring the original image data Do. The reference sign α in FIG. 3 indicates the point image information corresponding to the photography conditions. The point spread function as point image information of the optical system 12, is changed depending on not only a type of the lens 16 but also various photography conditions such as an aperture value, a focal length, a zoom ratio, an image height, the number of recorded pixels, and a pixel pitch. Accordingly, in order to calculate the restoration filter F, such photography conditions are acquired.

Figure 4:
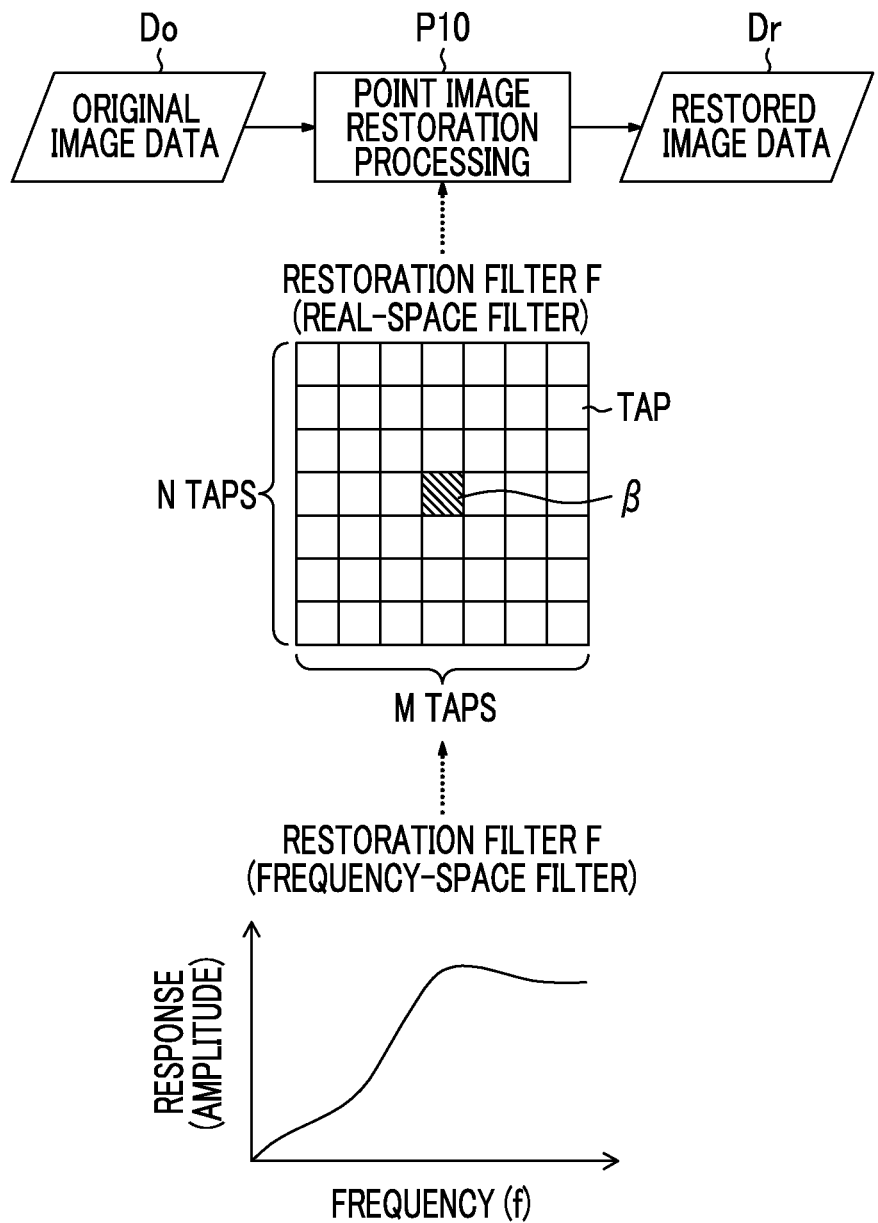
FIG. 4 is a block diagram illustrating a brief overview of an example of the restoration processing.

FIG. 4 is a diagram illustrating a brief overview of an example of the restoration processing.

As described above, the restoration processing (point image restoration processing) P10 is processing of creating the restored image data Dr from the original image data Do through filtering processing using the restoration filter F. For example, the real-space restoration filter F, which is formed of taps of N×M (N and M are integers equal to or greater than 2), is applied to the image data as a processing target. Thereby, by performing weighted average calculation (deconvolution calculation) on the pixel data (processing target pixel data of the original image data Do and adjacent-pixel data) corresponding to a filter coefficient which is allocated in each tap, it is possible to calculate the pixel data (restored image data Dr) subjected to the restoration processing. By sequentially applying the weighted average processing using the restoration filter F to data pieces of all pixels constituting the image data instead of the target pixels, it is possible to perform the restoration processing. The reference sign β in FIG. 4 indicates a tap (filter coefficient) applied to the processing target pixel data.

The real-space restoration filter formed of the N×M taps can be derived by performing inverse Fourier transform on a frequency-space restoration filter. Consequently, the real-space restoration filter can be appropriately calculated by specifying the frequency-space restoration filter as a reference and designating the number of taps constituting the real-space restoration filter.

The above-mentioned restoration processing can be performed on a plurality of successively photographed images (successive images). When the restoration processing is performed on the successive images, the restoration processing is performed on each (each frame) of a plurality of images constituting the successive images.

As the original image data on which the restoration processing is performed, it is possible to use image data of each color of RGB or a luminance signal (Y data) which can be obtained through RGB/YCrCb conversion from the image data of each color of RGB.

Timing of performing the restoration processing is not particularly limited. The restoration processing may be performed on the luminance signal (Y data) obtained from the image data (RGB data), which is obtained after demosaic processing, as the original image data. In addition, the restoration processing may be performed on "image data (mosaic image data) obtained before the demosaic processing" or "image data (demosaic image data) obtained before luminance signal conversion processing after the demosaic processing".

First Embodiment

In the present embodiment, the restoration processing is controlled in accordance with a degree of the small-aperture blurring.

Figure 5:
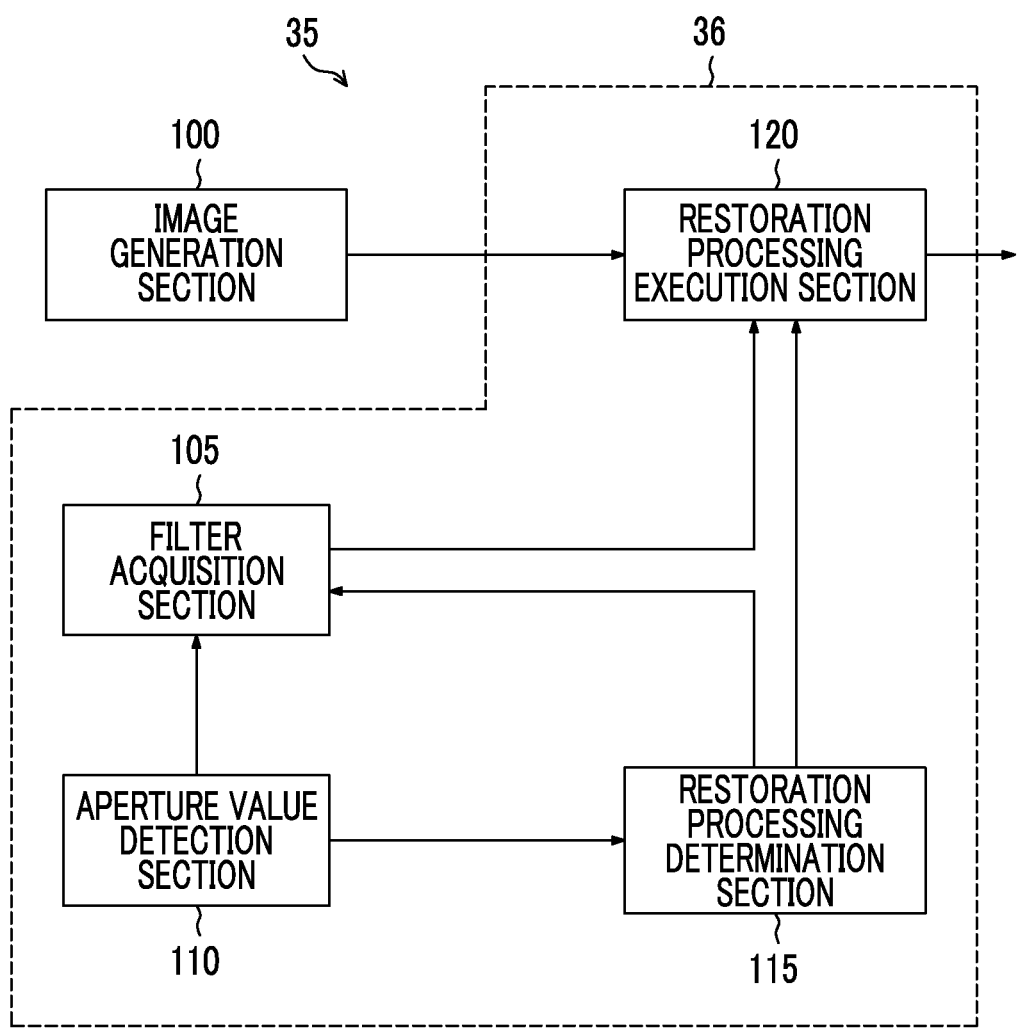
FIG. 5 is a block diagram illustrating an example of a function configuration of the camera main body controller according to a first embodiment.

FIG. 5 is a detailed function block diagram of the image processing section 35 and the restoration processing section 36 (refer to FIG. 2) included in the image processing section 35 in the camera main body controller 28. It should be noted that a plurality of function blocks in the drawing are not necessarily separately provided. The plurality of function blocks may be implemented by hardware and/or software integrally formed.

The image processing section 35 includes an image generation section 100. The restoration processing section 36 includes a filter acquisition section 105, an aperture value detection section 110, a restoration processing determination section 115, and a restoration processing execution section 120.

The image generation section 100 generates a moving image on the basis of the image data which is generated by the imaging section 11. Specifically, light of the subject image, which is captured by the optical system 12, passes through the aperture stop 17, and is received by the imaging element 26. Then, the imaging element 26 obtains image data of the subject image by receiving the light thereof. Thereafter, the image generation section 100 generates a moving image on the basis of the image data which is held by the imaging element 26 within the imaging section 11.

In a case of generating a moving image on which the thinning-out processing is performed, the image generation section 100 acquires image data by performing thinning-out reading from the imaging element 26, and generates a thinned-out moving image. Further, the image generation section 100 may be generate a thinned-out moving image by acquiring the image data by reading the entire image data from the imaging element 26, temporarily storing the read entire image data in a buffer memory (not shown in the drawing) within the image generation section 100, and performing the thinning-out processing on the read entire image data which is temporarily stored. In addition, when the image data is read from the imaging element 26, the device control section 34 controls the imaging element 26.

The filter acquisition section 105 acquires the restoration filter used in the restoration processing, on the basis of the photography conditions and the like. That is, the filter acquisition section 105 acquires the restoration filter, which is generated corresponding to the transfer function (point spread function) for point distribution of the optical system 12, in accordance with the photography conditions. The filter acquisition section 105 is able to acquire the restoration filter through various methods. For example, the filter acquisition section 105 may acquire the restoration filter through calculation based on the photography conditions. Further, the filter acquisition section 105 may store a plurality of restoration filters in a memory, which is not shown, in advance, and may select and acquire a restoration filter, which is appropriate for the photography conditions, among the plurality of stored restoration filters.

The filter acquisition section 105 may acquire the aperture value, which is detected by the aperture value detection section 110 to be described later, as necessary, and may newly calculate and acquire the restoration filter on the basis of the acquired aperture value. Alternatively, the filter acquisition section 105 may select and acquire an optimal restoration filter from the plurality of restoration filters, which is stored in advance, on the basis of the acquired aperture value.

In an initial step of image capturing, the filter acquisition section 105 may acquire the restoration filter, which is generated corresponding to the transfer function for the point distribution of the optical system 12, on the basis of the aperture value which is closer to a small-aperture side than the aperture value detected by the aperture value detection section 110. Thereby, even in the initial step of the image capturing, it is possible to appropriately detect an aperture value. The initial step of image capturing of a subject is defined as a step performed until the photography conditions are set immediately after start of photography. For example, the initial step of the image capturing is defined as a step performed for 5 or 20 seconds after the start of the photography. Alternatively, the initial step may be a step performed until the automatic exposure control (AE) or the auto focus adjustment (AF) is performed after the start of the photography.

The aperture value detection section 110 detects an aperture value of the optical system 12 (diaphragm 17) when the imaging section 11 captures an image of the subject. The method of detecting the aperture value through the aperture value detection section 110 is not particularly limited, and various methods capable of detecting the aperture value can be adopted.

For example, when the aperture stop 17 is controlled by the device control section 34 (refer to FIG. 2), the aperture value detection section 110 is able to detect the aperture value from the device control section 34. For example, when the aperture stop 17 is directly manually or automatically controlled, the aperture value detection section 110 may detect the aperture value from the optical system operation section 18 or the optical system controller 20. Further, in the initial step of the image capturing, the aperture value detection section 110 may acquire the aperture value on the basis of the luminance which is obtained from the moving image. Here, the luminance obtained from the moving image is defined as a luminance which can be measured on the basis of a photometric value and the like of the moving image.

The aperture value is defined as a value which indicates a size of an aperture of the aperture stop 17. The aperture value is not particularly limited, and may be a value which indicates a size of an aperture or a degree of opening of the aperture stop 17. For example, the aperture value may be the F number.

Figure 6:
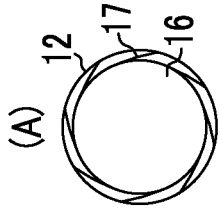
FIG. 6 is a diagram illustrating aperture values (F numbers).

FIG. 6 schematically shows "relationships between the optical system 12, the lens 16, and the aperture stop 17" on the basis of differences between aperture states. (A) of FIG. 6 is a schematic diagram illustrating a case where the aperture state is on a furthest open side. (B) and (C) of FIG. 6 are schematic diagram illustrating a case where the aperture state is between the furthest open side and the small-aperture side. (D) of FIG. 6 is a schematic diagram illustrating a case where the aperture state is on the small-aperture side.

In FIG. 6, the F numbers corresponding to the aperture states are denoted. The F numbers shown in FIG. 6 are F1 closest to the open side, and thereafter F1.4, F2, F2.8, F4, F5.6, F8, F11, F16, and F22 which are arranged stepwise. When the aperture value (F number) is larger, the aperture value is located at a position closer to the small-aperture side. For example, (A) of FIG. 6 shows an aperture state of the aperture stop 17 at F1.4, (B) of FIG. 6 shows an aperture state of the aperture stop 17 at F5.6, (C) of FIG. 6 shows an aperture state of the aperture stop 17 at F11, and (D) of FIG. 6 shows an aperture state of the aperture stop 17 at F22. Further, as for the F number, stopping down by one stop means making the aperture smaller, for example, from F5.6 to F8.

It should be noted that a correspondence relationship between the schematic diagrams of (A) to (D) of FIG. 6 and the F numbers shown in FIG. 6 is just an example, and the present invention is not limited to this.

The restoration processing determination section 115 of FIG. 5 determines whether or not the aperture value detected by the aperture value detection section 110 is greater than a small-aperture-blurring reference aperture value. That is, the restoration processing determination section 115 has the small-aperture-blurring reference aperture value, and compares the small-aperture-blurring reference aperture value with the aperture value which is acquired from the aperture value detection section 110. A location, at which the small-aperture-blurring reference aperture value is held or stored, is not particularly limited. For example, the restoration processing determination section 115 may hold the small-aperture-blurring reference aperture value. Further, the small-aperture-blurring reference aperture value may be input through the user interface 37.

As shown in FIGS. 7A to 7G, when the aperture stop 17 is stopped down, blurring (small-aperture blurring) occurs in an image in accordance with a degree of the aperture of the aperture stop 17, due to the effect of the light diffraction phenomenon. It should be noted that FIG. 7 is just an example, and the present invention is not limited to this. Thus, there may be various forms of occurrence of blurring caused by the effect of the aperture of the aperture stop 17 in an image.

FIGS. 7A to 7G are images (point images) which are obtained by capturing images of a point light source, and are point images which are affected by diffraction of the aperture stop 17. FIG. 7A shows a point image which is obtained by capturing an image of the point light source at an aperture value of F2. FIG. 7B shows a point image which is obtained by capturing an image of the point light source at an aperture value of F2.8. FIG. 7C shows a point image which is obtained by capturing an image of the point light source at an aperture value of F4. FIG. 7D shows a point image which is obtained by capturing an image of the point light source at an aperture value of F5.6. FIG. 7E shows a point image which is obtained by capturing an image of the point light source at an aperture value of F8. FIG. 7F shows a point image which is obtained by capturing an image of the point light source at an aperture value of F11. FIG. 7G shows a point image which is obtained by capturing an image of the point light source at an aperture value of F16.

As shown in FIGS. 7A to 7G, when the aperture stop 17 is stopped down further, a degree of blurring of the point image becomes larger. For example, when the point image shown in FIG. 7A (aperture value=F2) and the point image shown in FIG. 7G (aperture value=F16) are compared, a degree of blurring of the point image shown in FIG. 7G is greater than a degree of blurring of the point image shown in FIG. 7A.

The point images of FIG. 7E (aperture value=F8), FIG. 7F (aperture value=F11), and FIG. 7G (aperture value=F16) have large degrees of blurring of the point images, and the effect of the small-aperture blurring is dominant in the images, as compared with the other point images (FIGS. 7A and 7B, FIG. 7C, and FIG. 7D). In this case, when F8 is set as a small-aperture-blurring reference aperture value, in the moving image captured at the aperture value of F8 or more, the effect of the small-aperture blurring is dominant. Then, when the aperture stop 17 is stopped down to an aperture value equal to or greater than the small-aperture-blurring reference aperture value (FIG. 7E (aperture value=F8), the effect of the small-aperture blurring is dominant in the images of FIG. 7F (aperture value=F11) and FIG. 7G (aperture value=F16)). However, the small-aperture blurring can be eliminated through the restoration processing.

As shown in FIGS. 7A to 7G a point spread function (PSF), which indicates a response corresponding to the point light source, changes depending on the aperture value, but the change in PSF is smaller on the small-aperture side. That is, the change in the point spread function between FIG. 7F and FIG. 7G is smaller than the change in the point spread function between FIG. 7A and FIG. 7B. In contrast, in a case where a degree (PSF) of the real point spread phenomenon of the photographed image does not sufficiently match the PSF of the restoration filter used in the restoration processing, the restoration processing may instead cause degradation (overcorrection and the like) in image quality. Accordingly, as described above, by performing the restoration processing on the small-aperture side where the change in PSF is small, it is possible to reduce a possibility that the restoration processing causes degradation in image quality. Specifically, the restoration processing performed on the small-aperture side is less likely to cause degradation in image quality in the restoration processing. As a result, it can be said that the restoration processing is highly stable.

Figure 8:
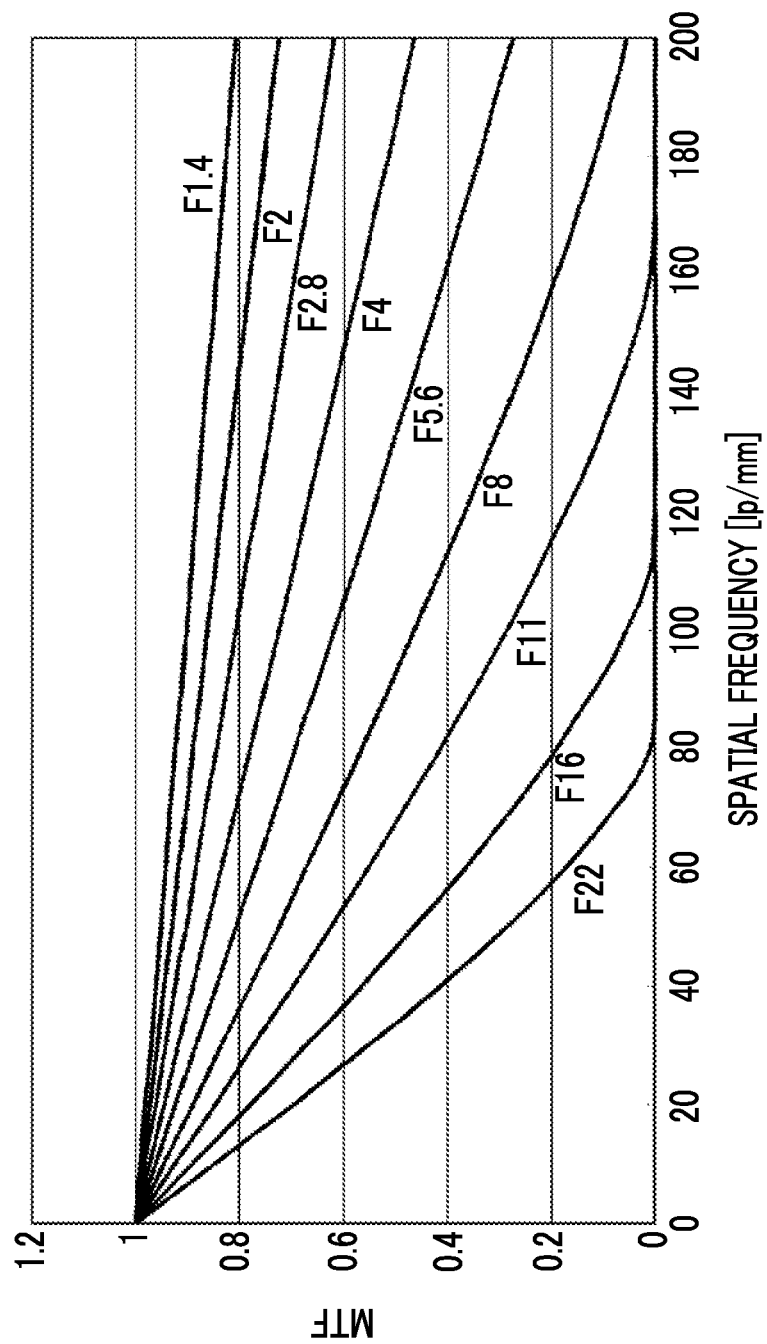
FIG. 8 is a diagram illustrating a correlation between the F number and the "spatial frequency-MTF".

FIG. 8 is a diagram illustrating an effect of diffraction for each F number in the lens 16. In the drawing, the degree of blurring caused by the diffraction according to the F number is described using a modulation transfer function (MTF). It should be noted that the horizontal axis of FIG. 8 indicates the spatial frequency, and the vertical axis of FIG. 8 indicates the MTF. When the aperture stop 17 is stopped down further, a value of the MTF on the high-frequency side becomes smaller.

An optical transfer function (OTF), which is obtained through Fourier transform of the point spread function (PSF), is frequency component information of blurring, and is represented by a complex number. An absolute value of the optical transfer function (OTF), that is, an amplitude component is referred to as an MTF, and the phase component is referred to as a phase transfer function (PTF). The MTF and PTF are respectively frequency characteristics of the amplitude component and the phase component of image degradation caused by blurring. Consequently, in a case of an image which has no blurring at all, the MTF is 1, and the MTF becomes less than 1 in accordance with the degree of blurring.

For example, in the case of F22, the MTF is 0 on a high-frequency side where the frequency is greater than about 80 (LP/mm (Line Pairs/mm)). In the case of F16, the MTF is 0 on a high-frequency side where the frequency is greater than about 110 (LP/mm). In the case of F11, the MTF is 0 on a high-frequency side where the frequency is greater than about 160 (LP/mm).

Here, the "small-aperture-blurring reference aperture value" means an aperture value at which the effect on the image having the "small-aperture blurring" is dominant. For example, when the aperture value of the aperture stop 17 is set on a small-aperture side where the aperture value is equal to or greater than the small-aperture-blurring reference aperture value, the effect of the "small-aperture blurring" is dominant, and is noticeable to be unignorable by a user.

As the small-aperture-blurring reference aperture value, various indicators can be employed if the indicator indicates an aperture value at which the effect of the small-aperture blurring is dominant. For example, as the small-aperture-blurring reference aperture value, the F number can be employed, and F8 or F11 may be set as the small-aperture-blurring reference aperture value. Further, for example, "the aperture stop 17 may be opened up by several stops from the smallest aperture state to the open side". In such a manner, the small-aperture-blurring reference aperture value may be represented.

Figure 9:
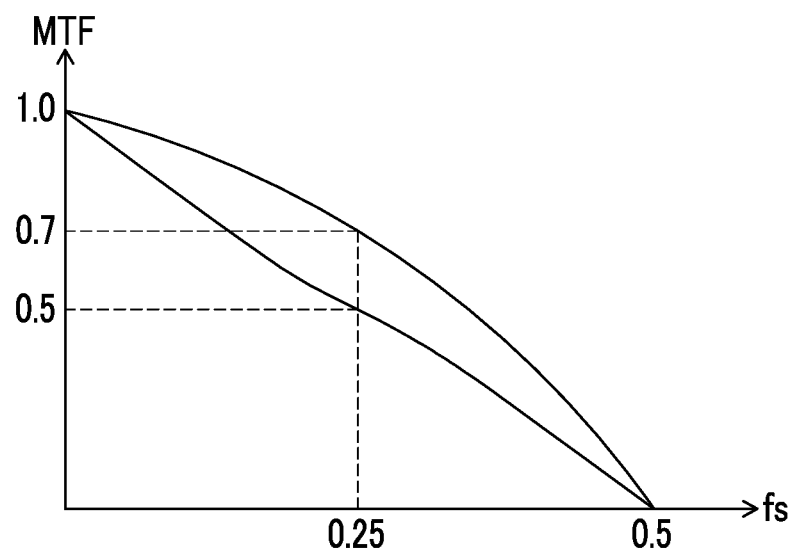
FIG. 9 is a diagram illustrating an example of an small-aperture blurring reference aperture value.

FIG. 9 is a diagram illustrating an example of the small-aperture-blurring reference aperture value. The horizontal axis of FIG. 9 indicates the frequency, and the vertical axis of FIG. 9 indicates the MTF. For example, as shown in FIG. 9, at a frequency (0.25 fs) as a half of the Nyquist frequency (0.5 fs), an F number, which indicates a value at which the MTF is equal to or less than 70% due to diffraction, may be set as the small-aperture-blurring reference aperture value. FIG. 9 is a diagram illustrating a relationship between the frequency and the MTF of the image which is photographed at a certain F number. As described above, the F number, at which the MTF is equal to or less than 70% at the frequency (0.25 fs) as a half of the Nyquist frequency, may be set as the small-aperture-blurring reference aperture value.

If it is determined that the aperture value detected by the aperture value detection section 110 is equal to or greater than the small-aperture-blurring reference aperture value, the restoration processing execution section 120 of FIG. 5 performs the restoration processing on the moving image. That is, from the restoration processing determination section 115, the restoration processing execution section 120 acquires a result of determination as to whether the aperture value detected by the aperture value detection section 110 is equal to or greater than the small-aperture-blurring reference aperture value or the aperture value detected by the aperture value detection section 110 is less than the small-aperture-blurring reference aperture value. Then, if it is determined that the aperture value detected by the aperture value detection section 110 is equal to or greater than the small-aperture-blurring reference aperture value, the restoration processing is executed.

In a broad sense, the restoration processing may be defined to include: processing (filter application processing) of applying the restoration filter to the image data; and processing of adjusting an amplification ratio (restoration gain) of a difference between the original image data and the image data (restored image data) to which the restoration filter is applied.

Figure 10:
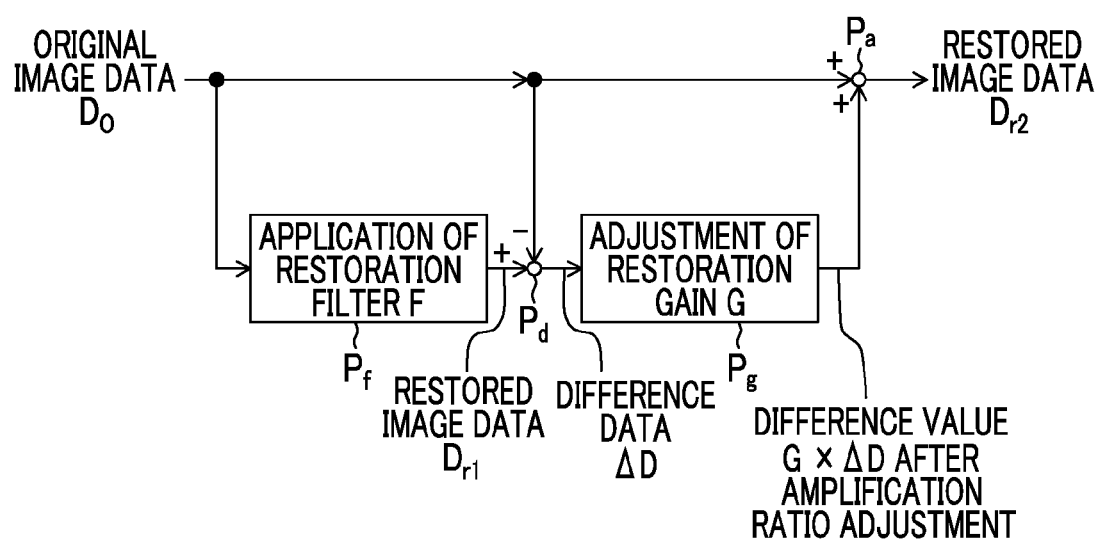
FIG. 10 is an example of a control block diagram of a restoration processing execution section.

FIG. 10 is a control block diagram illustrating an example of the restoration processing in the restoration processing execution section 120.

First, the restoration filter F is applied to the original image data Do (filter application processing $P_f$), and the restored image data Dr1 is calculated. The restoration filter F applied to the original image data Do is not particularly limited as long as the filter is based on the point spread function (PSF, OTF, MTF, PTF, or the like) of the optical system 12 (the lens 16, the aperture stop 17, or the like), and may be a real-space filter or a frequency-space filter (refer to FIG. 4).

Thereafter, a difference between the image data pieces before and after the restoration processing is derived (difference derivation processing $P_d$), and the amplification ratio (restoration gain) of the difference is adjusted (gain adjustment processing $P_g$). That is, in the difference derivation processing $P_d$, differential data ΔD (ΔD=Dr1−Do) between the original image data Do and the restored image data Dr1 subjected to the filter application processing $P_f$ is calculated. Then, in the gain adjustment processing $P_g$, adjustment of the amplification ratio (restoration gain) G of the differential data ΔD is performed, a difference value (G×ΔD) after the amplification ratio adjustment is calculated, and addition processing Pa between the original image data Do and the difference value (G×ΔD) after the amplification ratio adjustment is performed, thereby calculating restored image data Dr2 (Dr2=Do+G×ΔD). It should be noted that, as the restoration processing, another method similar to the above-mentioned method may be adopted. For example, the following processing may be adopted. The restoration filter F is applied to the original image data Do (filter application processing $P_f$), and the restored image data Dr1 is calculated. Subsequently, in the gain adjustment processing $P_g$, adjustment of the amplification ratio (restoration gain) G is applied to the restored image data Dr1 (Dr1×G), and addition processing Pa, in which the above data and the original image data Do are multiplied by (1−G), is performed. Thereby, restored image data Dr2 may be calculated.

As described above, the restoration strength of the restoration processing changes depending on the restoration filter (filter coefficient) in the filter application processing $P_f$ and the amplification ratio (restoration gain) G in the gain adjustment processing $P_g$. Hence, the adjustment of the restoration strength of the restoration processing can be executed through "switching the restoration filter (filter coefficient) used in the filter application processing $P_f$" and/or "changing of the amplification ratio (restoration gain) G in the gain adjustment processing $P_g$".

Accordingly, the restoration processing execution section 120 is able to adjust the restoration strength of the restoration processing by adjusting the filter coefficient of the restoration filter F or adjusting the restoration gain G.

The restoration processing execution section 120 may perform restoration processing of correcting only an amplitude component of the transfer function for the point distribution of the optical system 12 when the restoration processing is performed on the moving image. Thereby, calculation load of the restoration processing is reduced less than that in a case of correcting both the amplitude component and the phase component of the transfer function for the point distribution of the optical system 12. In some cases, image quality may be instead degraded if the restoration processing is performed on a defocused image. Therefore, in the initial step of the image capturing, after waiting until the subject is in focus, the restoration processing is performed. Thereby, it is possible to prevent image quality from being instead degraded through the restoration processing.

The restoration processing execution section 120 executes the restoration processing, after the subject is in focus, in the initial step in which the imaging section 11 generates a moving image.

Figure 11:
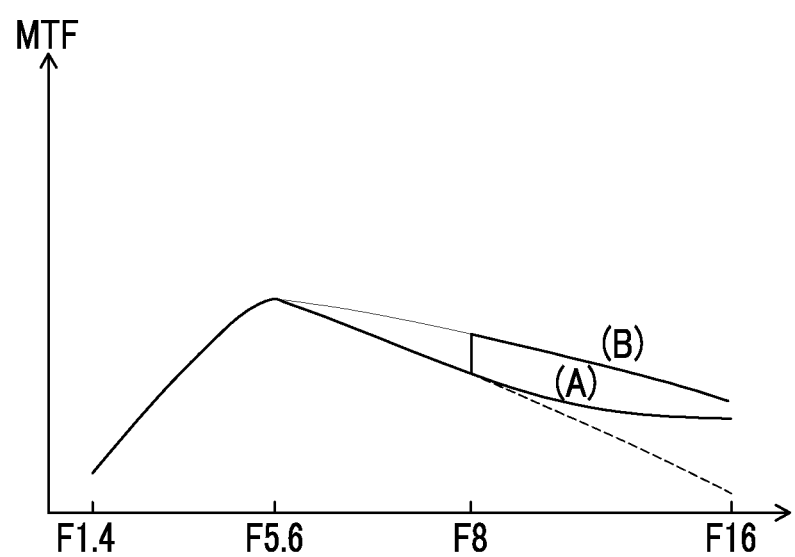
FIG. 11 is a diagram illustrating an example of the restoration processing in the restoration processing execution section.

FIG. 11 is a diagram schematically illustrating the restoration of the MTF when the restoration processing execution section 120 performs the restoration processing. In FIG. 11, the horizontal axis indicates the F number, the vertical axis indicates the value of the MTF, and the small-aperture-blurring reference aperture value is set as F8. In the example shown in FIG. 11, at F8 as the small-aperture-blurring reference aperture value, the MTF is restored. In addition, the dotted line between F8 and F16 indicates the value of the MTF before the restoration processing has been performed. The restoration processing execution section 120 performs the restoration processing, whereby the MTF indicated by the dotted line is restored like (A) or (B) of FIG. 11. (A) of FIG. 11 indicates a situation where the restoration processing is performed such that the value of the MTF up to F8 is kept substantially constant. In contrast, (B) of FIG. 11 indicates a situation where the restoration processing is performed in consideration of a case where the value of the MTF gradually decreases between F5.6 and F8 (refer to the thin line in FIG. 11).

The restoration of the value of the MTF in the restoration processing may be performed in a manner similar to that of (A) of FIG. 11 or (B) of FIG. 11. It should be noted that, since various methods can be employed as the method of restoring the MTF, the method is not limited to the examples shown in FIG. 11.

Figure 12:
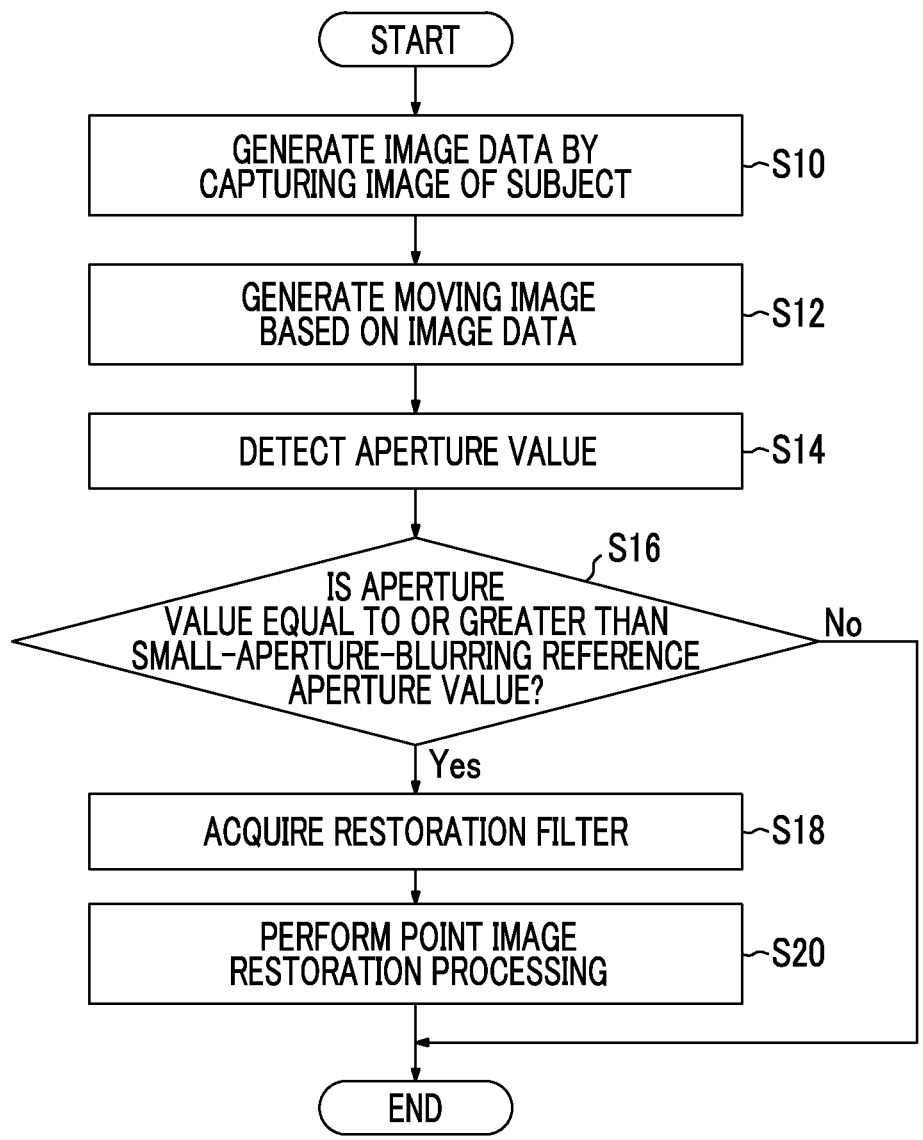
FIG. 12 is a flowchart illustrating a restoration processing flow according to the first embodiment.

FIG. 12 is a flowchart illustrating a restoration processing flow according to the first embodiment. First, the imaging section 11 of the digital camera 10 captures images of a subject through the optical system 12, thereby generating image data (step S10 of FIG. 12: an imaging step). The image generation section 100 generates a moving image on the basis of the image data (step S12: an image generation step). Subsequently, the aperture value detection section 110 detects an aperture value when the image data is acquired (step S14: an aperture value detection step). Thereafter, the restoration processing determination section 115 determines whether or not the aperture value detected by the aperture value detection section 110 is equal to or greater than the small-aperture blurring reference aperture value (step S16: a restoration processing determination step).

If the aperture value detected by the aperture value detection section 110 is less than the small-aperture-blurring reference aperture value (No in step S16), the restoration processing is skipped and another image processing is performed as necessary. In contrast, if the aperture value detected by the aperture value detection section 110 is equal to or greater than the small-aperture-blurring reference aperture value (Yes in step S16), the filter acquisition section 105 acquires the restoration filter (step S18: a filter acquisition step). Then, the acquired restoration filter is sent to the restoration processing execution section 120. Thereafter, the restoration processing execution section 120 performs the restoration processing on the moving image, which is acquired from the image generation section 100, on the basis of the restoration filter which is acquired from the filter acquisition section 105 (step S20: a restoration processing execution step).

The processing of determining whether or not to perform the restoration processing (step S16) and the other processing accompanying the determination are performed for each of the images (frames) constituting successive images, and the restoration processing is optimized on an image basis.

As described above, in the above-mentioned first embodiment, the restoration processing is performed only on the small-aperture side where the aperture value is equal to or greater than the small-aperture-blurring reference aperture value. Thus, it is possible to effectively eliminate small-aperture blurring dominant in image quality. Further, in the above-mentioned first embodiment, the restoration processing is not performed on a side where the aperture is further open than that at the small-aperture-blurring reference aperture value. Thus, it is possible to reduce sizes of circuits contributing to the image processing. In moving image photography, defocus may occur due to movement of a subject or movement of the imaging device in the process of photography, or may occur while the imaging device is operating until the imaging device is in focus at an appropriate in-focus position. Even when an image includes a defocus region which tends to be formed in the process of moving image photography, by performing the restoration processing on the small-aperture side where the change in PSF is small, it is possible to it is possible to reduce a possibility that the restoration processing causes degradation in image quality.

Second Embodiment

In the present embodiment, execution of the restoration processing is controlled in accordance with a distortion-suppression aperture value as an aperture value corresponding to the small-aperture blurring which suppresses aliasing distortion. Thereby, in the present embodiment, it is possible to obtain an image where aliasing distortion, which is caused when thinning-out processing is performed, is suppressed and small-aperture blurring is eliminated. According to the present embodiment, it is possible to effectively prevent degradation in image quality from being caused when the restoration processing is performed on the image having aliasing distortion.

Comparing the first embodiment and the second embodiment, in the first embodiment, execution of the restoration processing is controlled on the basis of the "small-aperture-blurring reference aperture value", but in the second embodiment, execution of the restoration processing is controlled on the basis of the "distortion-suppression aperture value".

In the present embodiment, configurations and effects the same as those of the above-mentioned first embodiment will be omitted.

In the second embodiment, the restoration processing determination section 115 shown in FIG. 5 determines whether or not the aperture value detected by the aperture value detection section 110 is the distortion-suppression aperture value. Here, the distortion-suppression aperture value is an aperture value corresponding to small-aperture blurring which suppresses aliasing distortion caused when the thinning-out processing is performed. The distortion-suppression aperture value will be described below in detail.

The aliasing distortion is noise which a response at a frequency equal to or greater than the Nyquist frequency becomes on a low frequency side when the thinning-out processing for the image data is performed. For example, as an example of the aliasing distortion, there is a distortion having geometric patterns which does not belong to an original subject but occurs in an image thereof. Meanwhile, the geometric patterns caused by the aliasing distortion are reduced by blurring the image.

As described above, when the aperture stop 17 is stopped down, small-aperture blurring is caused by diffraction, but the aliasing distortion can be suppressed using the small-aperture blurring. Consequently, in an area where the small-aperture blurring occurs above a certain extent, aliasing distortion is suppressed.

The present embodiment is for obtaining a moving image having better image quality by using a relationship between the small-aperture blurring and the aliasing distortion.

Figure 13A:
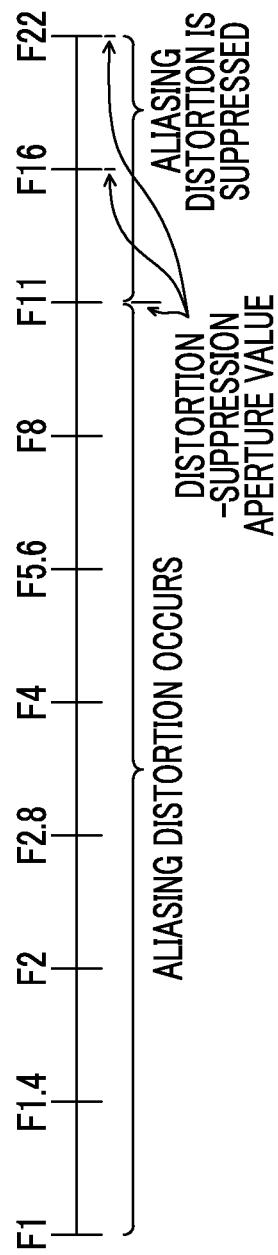
FIGS. 13A and 13B are diagrams illustrating the distortion-suppression aperture values according to a second embodiment.
Figure 13B:
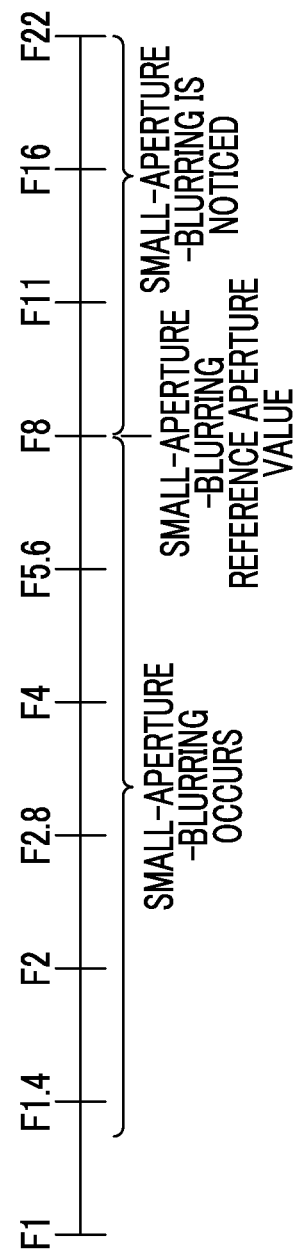

FIG. 13A is a diagram illustrating an example of the distortion-suppression aperture value in the second embodiment. FIG. 13B is a diagram illustrating the small-aperture-blurring reference aperture value in the first embodiment. It should be noted that FIGS. 13A and 13B are just examples of the distortion-suppression aperture value and the small-aperture-blurring reference aperture value, and such values are not limited.

FIG. 13A shows a case where the distortion-suppression aperture value is F11, F16, and F22. In FIG. 13A, in a range of F1 to F8, small-aperture blurring does not occur, or even when small-aperture blurring occurs, blurring is small to the extent that aliasing distortion can be sufficiently suppressed, and thus aliasing distortion occurs. In contrast, at F11, F16 and F22 as the distortion-suppression aperture values, the small-aperture blurring sufficient for suppressing the aliasing distortion occurs, and thus aliasing distortion is suppressed. As described above, as the distortion-suppression aperture value, an aperture value corresponding to the small-aperture blurring having a relatively large degree of blurring is selected.

FIG. 13B shows the first embodiment in a case where the small-aperture-blurring reference aperture value is F8. In this case, if the aperture value is equal to or greater than the small-aperture-blurring reference aperture value (F8), the small-aperture blurring is dominant in image degradation. In contrast, if the aperture value is less than the small-apertureblurring reference aperture value (F8), the small-aperture blurring is not dominant in image degradation.

It should be noted that, as the distortion-suppression aperture value, various values may be employed if the values indicate the aperture value corresponding to the small-aperture blurring which suppresses aliasing distortion. For example, as the distortion-suppression aperture value, the F number is employed. Further, for example, "the aperture stop 17 may be opened up by several stops from the smallest aperture state to the open side". In such a manner, the distortion-suppression aperture value may be represented. Furthermore, for example, the F number, at which the MTF is lowered by 50% or more due to diffraction at the frequency (0.25 fs) as a half of the Nyquist frequency, may be set as the distortion-suppression aperture value (refer to FIG. 9).

In the second embodiment, if it is determined that the aperture value detected by the aperture value detection section 110 is the distortion-suppression aperture value, the restoration processing execution section 120 executes the restoration processing on the moving image, which is subjected to the thinning-out processing, through the restoration filter.

As described above, in the above-mentioned second embodiment, execution of the restoration processing is controlled in accordance with "the aperture value corresponding to the small-aperture blurring which suppresses aliasing distortion caused when the thinning-out processing is performed". Thus, the effect of aliasing distortion is reduced in the moving image on which the restoration processing is performed. As a result, it is possible to appropriately perform the restoration processing. Further, in the above-mentioned second embodiment, the restoration processing is performed only on the moving image which is captured at an aperture value corresponding to the distortion-suppression aperture value. Thus, it is possible to effectively eliminate small-aperture blurring having a great effect on image quality. Furthermore, in the above-mentioned second embodiment, the restoration processing is not performed on the moving image which is captured at an aperture value other than the distortion-suppression aperture value. Thus, it is possible to reduce sizes of circuits contributing to the image processing. Thereby, even when an image includes a defocus region which tends to be formed in the process of moving image photography, it is possible to reduce a possibility that the restoration processing causes degradation in image quality.

Third Embodiment

In the present embodiment, when the moving image and the still image are generated, the restoration processing is performed on each of the moving image and the still image on a different basis. Therefore, execution of the restoration processing, which is sufficient for an image quality required for each of the moving image and the still image, will be described. It should be noted that the still image described herein means a single discrete image which has no correlation with other images which are adjacent in time.

In the present embodiment, configurations and effects the same as those of the above-mentioned first embodiment will be omitted.

In the third embodiment, the restoration processing execution section 120 shown in FIG. 5 performs the restoration processing on the still image at aperture values which are within a range larger than that of the restoration processing for the moving image. Thereby, in the third embodiment, as for the still image, a demand for higher image quality is satisfied, and as for the moving image, a demand for effective improvement in image quality is satisfied. In addition, it is possible to reduce sizes of circuits contributing to the image processing.

The image generation section 100 generates a moving image and a still image on the basis of the image data which is generated by the imaging section 11. That is, the image generation section 100 acquires the image data which is held in the imaging element 26 of the imaging section 11, and generates a moving image and a still image. For example, an instruction to create the still image is given by a shutter button provided in the user interface 37, and the creation is performed under control of the device control section 34 performed on the image generation section 100.

When the restoration processing determination section 115 determines whether or not to perform the restoration processing on the still image, the determination is performed on the basis of an aperture value closer to the open side by at least one stop than the small-aperture-blurring reference aperture value. Specifically, when the restoration processing determination section 115 of the third embodiment determines whether or not to perform the restoration processing on the moving image, the "small-aperture-blurring reference aperture value" is used. However, when the restoration processing determination section 115 determines whether or not to perform the restoration processing on the still image, the "still-image reference aperture value" is used. Here, the still-image reference aperture value is defined in terms of performing the image processing on the still image which is photographed in a range of the aperture value larger than that of the moving image. It should be noted that "one stop" means one step in stepwise adjustment of the aperture stop 17. When the adjustment of the aperture stop 17 is performed in steps of F1.4, F2, F2.8, F4, F5.6, F8, F11, for example, stopping the aperture stop 17 down from F1.4 to F2 is referred to as stopping down by one stop.

Figure 14:
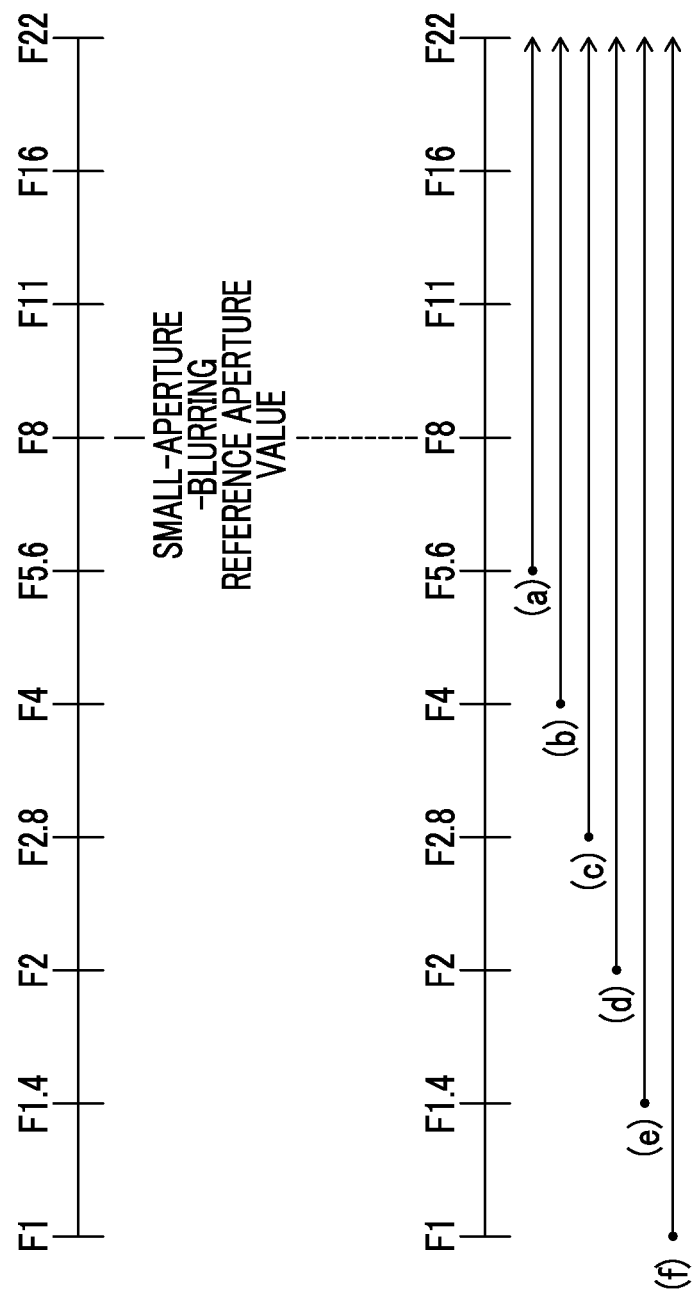
FIG. 14 is a diagram illustrating a still-image reference aperture value according to a third embodiment.

FIG. 14 is a diagram illustrating the small-aperture-blurring reference aperture value and the still-image reference aperture value. The small-aperture-blurring reference aperture value is used when the restoration processing is performed on the moving image. The still-image reference aperture value is used when the restoration processing is performed on the still image.

(A) of FIG. 14 shows a case where the restoration processing is performed on a moving image. In this case, as the small-aperture-blurring reference aperture value, F8 is employed. Thus, the restoration processing is performed on a moving image which is captured at F8 or more, and the restoration processing is not performed on a moving image which is captured at a condition of less than F8.

(B) of FIG. 14(B) shows a case where the restoration processing is performed on a still image. In this case, the small-aperture-blurring reference aperture value is F8 (FIG. 14(A)). Therefore, the still-image reference aperture value can be set as F5.6 ((a) of FIG. 14(B)), F4 ((b) of FIG. 14(B)), F2.8 ((c) of FIG. 14(B)), F2 ((d) of FIG. 14(B)), F1.4 ((e) of FIG. 14(B)), or F1 ((f) of FIG. 14(B)). That is, the still-image reference aperture value may be less than the small-aperture-blurring reference aperture value. For example, the still-image reference aperture value may be an aperture value closer to the open side by at least one stop than the small-aperture-blurring reference aperture value. In the case shown in FIG. 14, the small-aperture-blurring reference aperture value is F8, and thus F5.6, F4, F2.8, F2, F1.4, or F1 can be employed.

The restoration processing determination section 115 may determine whether or not to perform the restoration processing on the moving image, on the basis of the "distortion-suppression aperture value". That is, when determining whether or not to perform the restoration processing on the still image, the restoration processing determination section 115 determines whether or not to perform the restoration processing on the still image, on the basis of the still-image reference aperture value as an aperture value which is less than the distortion-suppression aperture value closest to an open side among the distortion-suppression aperture values. For example, the restoration processing determination section 115 may perform the determination on the basis of the "still-image reference aperture value" as an aperture value closer to the open side by at least one stop than the distortion-suppression aperture value. In this case, if there is a plurality of distortion-suppression aperture values, the still-image reference aperture value may be an aperture value closer to the open side by at least one stop than the distortion-suppression aperture value closest to the open side. If there is one distortion-suppression aperture value, the still-image reference aperture value may be an aperture value closer to the open side by at least one stop than the distortion-suppression aperture value.

When the restoration processing determination section 115 of the second embodiment determines whether or not to perform the restoration processing on the moving image, the distortion-suppression aperture value is used. However, in the third embodiment, when it is determined whether or not to perform the restoration processing on the still image, the determination may be performed on the basis of not the distortion-suppression aperture value but the still-image reference aperture value.

Figure 15:
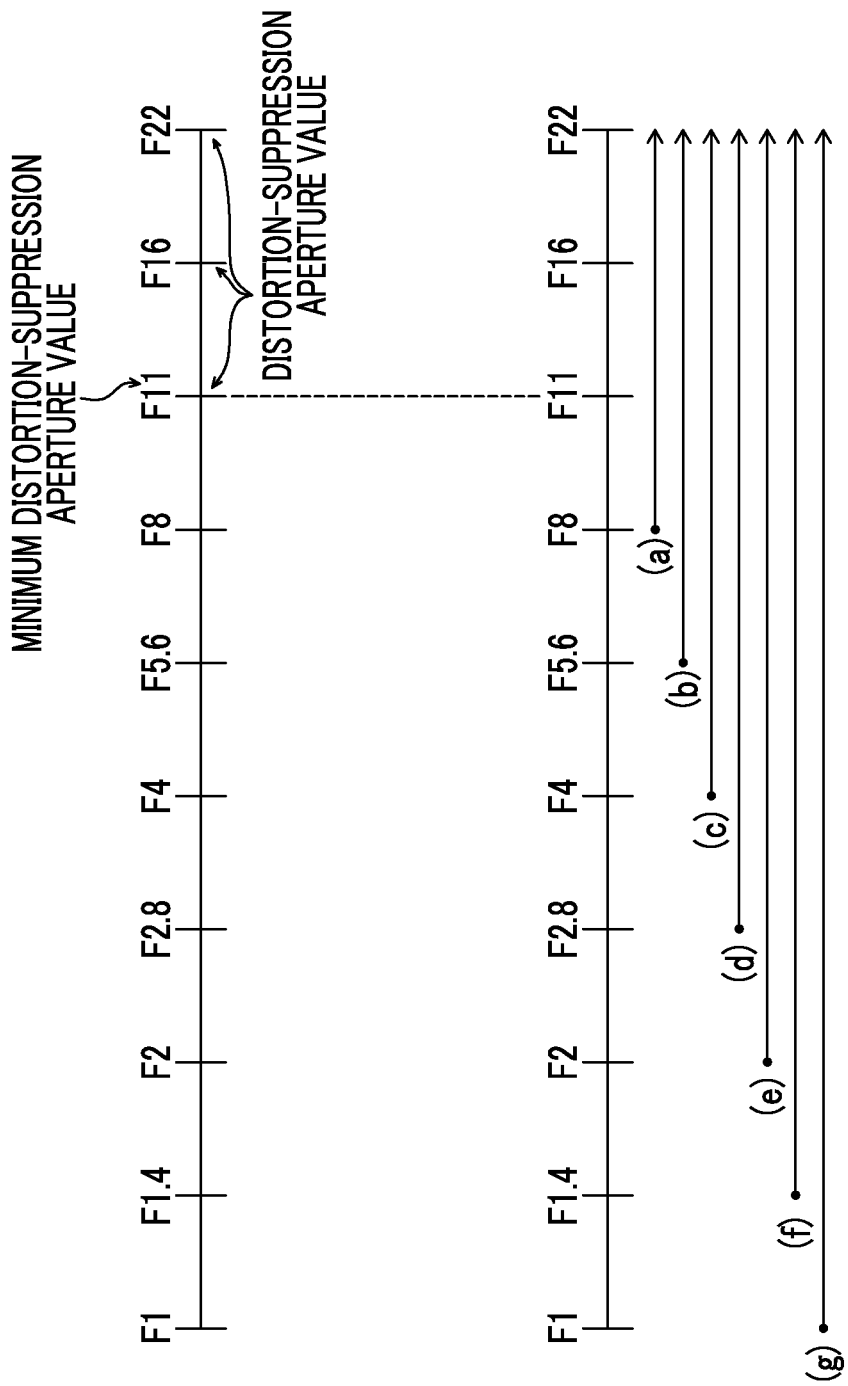
FIG. 15 is a diagram illustrating the still-image reference aperture value according to the third embodiment.

FIG. 15 is a diagram illustrating the distortion-suppression aperture value and the still-image reference aperture value. The distortion-suppression aperture value is used when the restoration processing is performed on the moving image. The still-image reference aperture value is used when the restoration processing is performed on the still image.

(A) of FIG. 15 shows a case where the restoration processing is performed on a moving image. In this case, as the distortion-suppression aperture value, F11, F16, and F22 are employed. Thus, the restoration processing is performed on a moving image which is captured at F11, F16, or F22, and the restoration processing is not performed on a moving image which is captured at an aperture value other than F11, F16, and F22. In FIG. 15(A), there is a plurality of distortion-suppression aperture values of F11, F16, and F22, and thus F11 is set as a minimum distortion-suppression aperture value.

(B) of FIG. 15 shows a case where the restoration processing is performed on a still image. In this case, the distortion-suppression aperture values are F11, F16, and F22 ((A) of FIG. 15). Therefore, in this case, the still-image reference aperture value can be set as F8 ((a) of (B) of FIG. 15), F5.6 ((b) of (B) of FIG. 15), F4 ((c) of (B) of FIG. 15), F2.8 ((d) of (B) of FIG. 15), F2 ((e) of (B) of FIG. 15), F1.4 ((f) of (B) of FIG. 15), or F1 ((g) of (B) of FIG. 15). That is, the still-image reference aperture value may be an aperture value closer to the open side by at least one stop than the distortion-suppression aperture value. In addition, as shown in (A) of FIG. 15, when there is the plurality of distortion-suppression aperture values, the still-image reference aperture value is an aperture value closer to the open side by at least one stop than the minimum distortion-suppression aperture value.

When the restoration processing determination section 115 determines that the aperture value detected by the aperture value detection section 110 is equal to or greater than the still-image reference aperture value, the restoration processing is executed on the still image through the restoration filter. Then, as described above, in consideration of the method of determining the still-image reference aperture value, the restoration processing on the still image is executed in a range of the aperture value larger than that of the restoration processing on the moving image.

The restoration processing execution section 120 is able to adjust the restoration strength of the restoration processing as described in FIG. 10. Consequently, when performing the restoration processing on the moving image, the restoration processing execution section 120 may execute the restoration processing by performing adjustment to make the restoration strength of the restoration processing weaker than that of the case of performing the restoration processing on the still image. If a subject is moving, then it is difficult to set the photography conditions, and it is difficult to perform the restoration processing. In such a case, by performing the restoration processing on the moving image with a weak restoration strength thereof, it is possible to effectively prevent degradation in image quality from being caused by the restoration processing. Further, by performing general restoration processing on a still image for which higher image quality than that of a moving image is required, it is possible to generate a still image having high image quality.

The filter acquisition section 105 shown in FIG. 5 acquires a restoration filter for the moving image when the restoration processing is performed on the moving image, and acquires a restoration filter for the still image when the restoration processing is performed on the still image. The restoration processing execution section 120 may execute the restoration processing through the restoration filter for the moving image when performing the restoration processing on the moving image, and executes the restoration processing through the restoration filter for the still image when performing the restoration processing on the still image. Here, the filter for the moving image may be a filter which is designed in consideration of characteristics of the moving image, and the filter for the still image may be a filter which is designed in consideration of characteristics of the still image. For example, a filter size of the restoration filter for the moving image may be designed to be smaller than a filter size of the restoration filter for the still image. The filter having a small filter size means, for example, a filter which is formed of a small number of taps.

The filter acquisition section 105 may acquire the restoration filter for the still image when the restoration processing is performed on the moving image, and acquires the restoration filter for the still image when the restoration processing is performed on the still image. The restoration processing execution section 120 may execute the restoration processing through the restoration filter for the still image when performing the restoration processing on the moving image, and executes the restoration processing through the restoration filter for the still image when performing the restoration processing on the still image. That is, a common filter may be provided for the moving image and the still image.

As described above, in the above-mentioned third embodiment, execution of the restoration processing on the moving image is controlled in accordance with the "small-aperture blurring reference aperture value" or the "distortion-suppression aperture value", and execution of the restoration processing on the still image is controlled in accordance with the "still-image reference aperture value". Therefore, it is possible to perform the restoration processing which is sufficient for an image quality required for each of the moving image and the still image. Thereby, even when an image includes a defocus region which tends to be formed in the process of moving image photography, it is possible to reduce a possibility that the restoration processing causes degradation in image quality.

<Example of Application to EDoF System>

In the above-mentioned embodiment, the restoration processing is image processing of restoring an original subject image by restoring and correcting point spread (point image blurring) in accordance with the specific photography conditions (for example, the aperture value, the F number, the focal length, the lens type, and the like). However, image restoration processing, to which the present invention can be applied, is not limited to the restoration processing according to the above-mentioned embodiment. For example, the restoration processing according to the present invention can be applied to restoration processing, which is performed on image data acquired and photographed through an optical system (a photography lens or the like) having the extended depth of field (focus) (EDoF). By performing the restoration processing on the image data of a blurred image photographed and acquired in a state where the depth of field (depth of focus) is extended by the EDoF optical system, it is possible to restore and generate high-resolution image data of an image which is in focus in a wide range. In this case, the restoration processing is performed through the restoration filter which is based on the point spread function (PSF, OTF, MTF, PTF, or the like) of the EDoF optical system and which has a filter coefficient that is set to restore a desired image in a range of the extended depth of field (depth of focus).

Hereinafter, an example of the system (EDoF system) for restoration of the image data, which is photographed and acquired through the EDoF optical system, will be described. In addition, in the following example, a description will be given of an example in which the restoration processing is performed on the luminance signal (Y data). The luminance signal is obtained from the image data (RGB data) which is obtained after the demosaic processing. However, the timing of performing the restoration processing is not particularly limited. For example, the restoration processing may be performed on "the image data (mosaic image data) obtained before the demosaic processing" or "the image data (demosaic image data) obtained before the luminance signal conversion processing after the demosaic processing".

Figure 16:
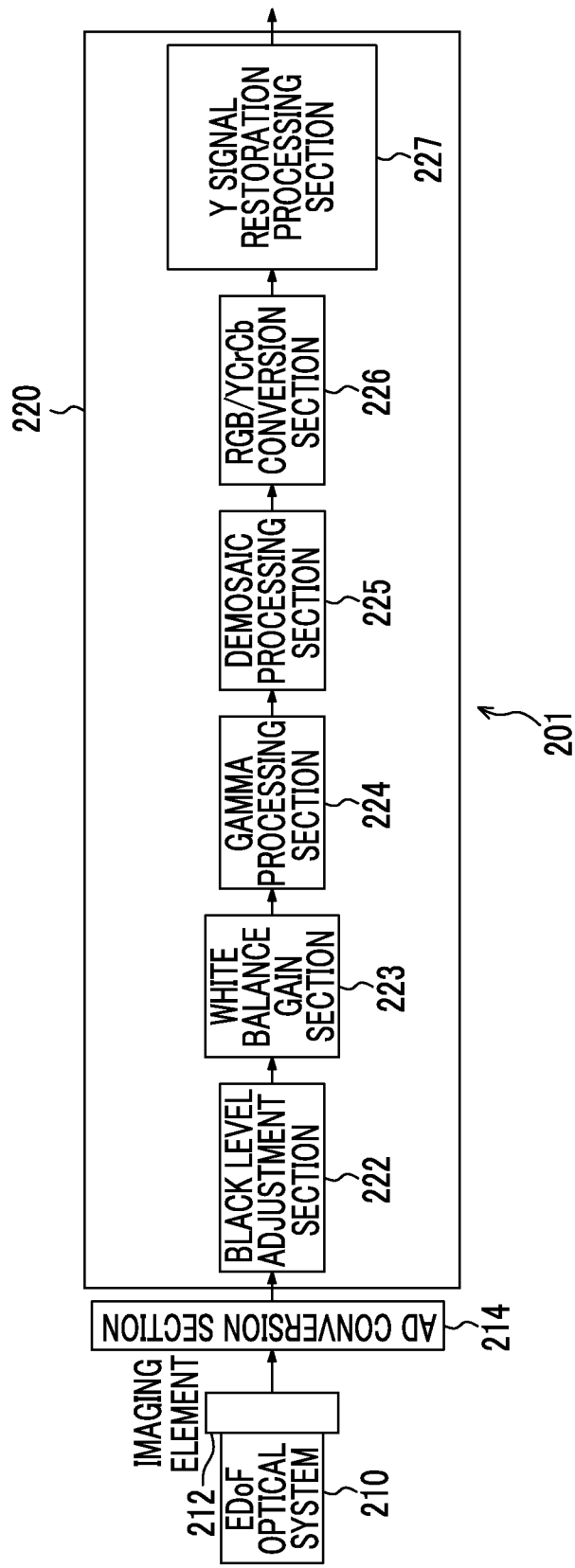
FIG. 16 is a block diagram illustrating an embodiment of an imaging module having an EDoF optical system.

FIG. 16 is a block diagram illustrating one form of an imaging module 201 including the EDoF optical system. The imaging module (such as digital camera) 201 of the present example includes an EDoF optical system (lens unit) 210, an imaging element 212, an AD conversion section 214, and a restoration processing block (image processing section) 220.

Figure 17:
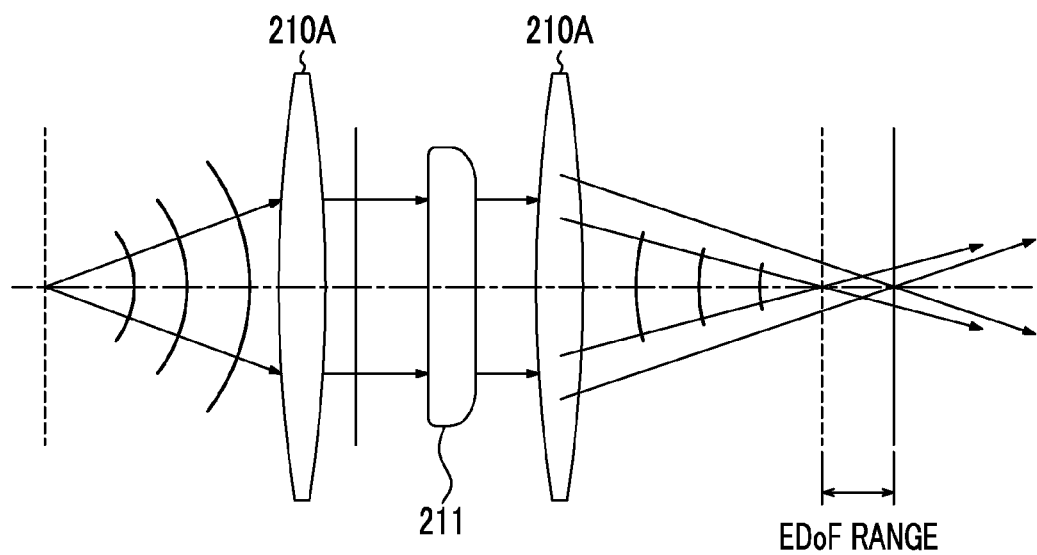
FIG. 17 is a diagram illustrating an example of the EDoF optical system.

FIG. 17 is a diagram illustrating an example of the EDoF optical system 210. The EDoF optical system 210 of the present example has a single-focus fixed photography lens 210A, and an optical filter 211 disposed at a pupil position. The optical filter 211 modulates a phase, and turns the EDoF optical system 210 (the photography lens 210A) to EDoF so as to obtain the extended depth of field (depth of focus) (EDoF). In such a manner, the photography lens 210A and the optical filter 211 constitute a lens section that modulates the phase and extends the depth of field.

The EDoF optical system 210 includes other components as necessary, and for example, an aperture stop (not shown in the drawing) is disposed near the optical filter 211. Further, the optical filter 211 may be one sheet or a combination of a plurality of sheets. Furthermore, the optical filter 211 is just one example of optical phase modulation means, and turning the EDoF optical system 210 (the photography lens 210A) to the EDoF may be realized by other means. For example, instead of providing the optical filter 211, turning the EDoF optical system 210 to the EDoF may be realized by the photography lens 210A designed so as to have a function equivalent to that of the optical filter 211 of the present example.

That is, turning the EDoF optical system 210 to the EDoF can be realized by various kinds of means that change a wavefront of image formation on a light receiving surface of the imaging element 212. For example, the following may be adopted as means of turning the EDoF optical system 210 to the EDoF: "an optical element for which a thickness changes"; "an optical element (a refractive index distribution type wavefront modulation lens or the like) for which a refractive index changes"; "an optical element (a wavefront modulation hybrid lens, an optical element formed as a phase surface on a lens surface, or the like) for which the thickness and the refractive index change by coating a lens surface or the like"; or "a liquid crystal element (a liquid crystal space phase modulation element or the like) capable of modulating a phase distribution of light". As described above, the present invention is applicable not only to a case that regularly distributed image formation is possible due to an optical wavefront modulation element (the optical filter 211 (phase plate)) but also to a case that distributed images similar to the case of using the optical wavefront modulation element can be formed by the photography lens 210A itself without using the optical wavefront modulation element.

The EDoF optical system 210 shown in FIG. 17 can be miniaturized since a focus adjusting mechanism that mechanically adjusts a focus can be omitted, and can be suitably mounted on a cellular phone with a camera or a portable information terminal.

An optical image after passing through the EDoF optical system 210 turned to the EDoF is formed on the imaging element 212 shown in FIG. 16 and converted into an electric signal here.

The imaging element 212 is constituted of a plurality of pixels arranged in a matrix shape by a predetermined pattern array (such as a Bayer array, a G stripe R/G full checkered pattern, an X-Trans array, or a honeycomb array). Each pixel includes a microlens, a color filter (an RGB color filter in the present example) and a photodiode. The optical image made incident on the light receiving surface of the imaging element 212 through the EDoF optical system 210 is converted into signal charges of an amount corresponding to an amount of incident light by the respective photodiodes arrayed on the light receiving surface. Then, R, G and B signal charges stored in the respective photodiodes are sequentially output as voltage signals (image signals) of the respective pixels.

The AD conversion section 214 converts analog R, G and B image signals which are output for the respective pixels from the imaging element 212 to digital RGB image signals. The digital image signals converted to the digital image signals by the AD conversion section 214 are added to a restoration processing block 220.

The restoration processing block 220 includes, for example, a black level adjustment section 222, a white balance gain section 223, a gamma processing section 224, a demosaic processing section 225, an RGB/YCrCb conversion section 226, and a Y signal restoration processing section 227.

The black level adjustment section 222 executes black level adjustment on the digital image signals which are output from the AD conversion section 214. For the black level adjustment, a known method may be adopted. For example, in the case of paying attention to a certain effective photoelectric conversion element, by obtaining an average of dark-current-amount acquisition signals corresponding to each of a plurality of OB photoelectric conversion elements included in a photoelectric conversion element row including the effective photoelectric conversion element, and subtracting the average from the dark-current-amount acquisition signals corresponding to the effective photoelectric conversion element, a black level is adjusted.

The white balance gain section 223 performs gain adjustment according to a white balance gain of the individual RGB chrominance signals included in the digital image signals for which black level data is adjusted.

The gamma processing section 224 performs gamma correction of correcting a gradation of a halftone or the like so as to adjust the white-balance-adjusted R, G and B image signals to have desired gamma characteristics.

The demosaic processing section 225 applies the demosaic processing to the R, G and B image signals obtained after the gamma correction. Specifically, the demosaic processing section 225 generates a set of image signals (R signal, G signal, B signal) to be output from individual light receiving pixels of the imaging element 212 by applying color interpolation processing to the R, G and B image signals. That is, while pixel signals from the individual light receiving pixels are one of the R, G and B image signals before color demosaic processing, the set of three pixel signals, which are R, G and B signals corresponding to the individual light receiving pixels, is output after the color demosaic processing.

The RGB/YCrCb conversion section 226 converts the demosaic-processed R, G and B signals of the respective pixels into a luminance signal Y and color difference signals Cr and Cb, and outputs the luminance signal Y and the color difference signals Cr and Cb of the respective pixels.

The Y signal restoration processing section 227 performs the restoration processing on the luminance signal Y, which is sent from the RGB/YCrCb conversion section 226, on the basis of the restoration filter stored in advance. The restoration filter is formed of, for example, a deconvolution kernel (corresponding to the number of taps of M=7 and N=7) having a kernel size of 7×7 and calculation coefficients (corresponding to restoration gain data and the filter coefficient) corresponding to the deconvolution kernel, and is used for deconvolution processing for phase modulation of the optical filter 211. In addition, for the restoration filter, the one corresponding to the optical filter 211 is stored in a memory (for example, a memory where the Y signal restoration processing section 227 is incidentally provided) not shown in the drawing. Further, the kernel size of the deconvolution kernel is not limited to 7×7.

Figure 18:
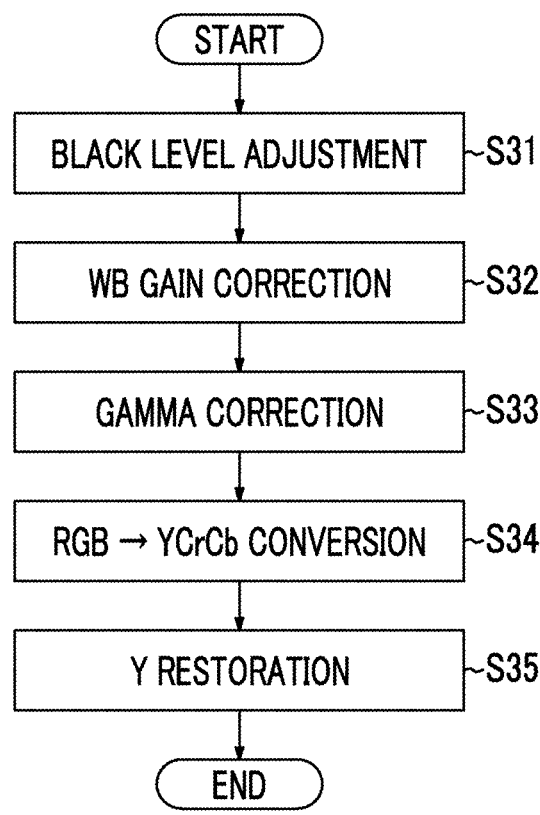
FIG. 18 is a diagram illustrating an example of a restoration processing flow represented by restoration processing blocks shown in FIG. 16.

Next, the restoration processing performed by the restoration processing block 220 will be described. FIG. 18 is a flowchart illustrating an example of the restoration processing in the restoration processing block 220 shown in FIG. 16.

The digital image signals are added from the AD conversion section 214 to one input of the black level adjustment section 222, the black level data is added to the other input, and the black level adjustment section 222 subtracts the black level data from the digital image signals and outputs the digital image signals, from which the black level data is subtracted, to the white balance gain section 223 (S31). Thereby, black level components are not included in the digital image signals, and the digital image signal, which indicates a black level, becomes 0.

Processing by the white balance gain section 223 and the gamma processing section 224 is sequentially performed on the image data obtained after the black level adjustment (S32 and S33).

The gamma-corrected R, G and B signals are subjected to the demosaic processing through the demosaic processing section 225, and then converted into the luminance signal Y and chroma signals Cr and Cb in the RGB/YCrCb conversion section 226 (S34).

The Y signal restoration processing section 227 performs the restoration processing of applying the deconvolution processing for the phase modulation of the optical filter 211 of the EDoF optical system 210 to the luminance signal Y (S35). That is, the Y signal restoration processing section 227 performs the deconvolution processing of the luminance signals (the luminance signals of 7×7 pixels here) corresponding to a pixel group of a predetermined unit with an arbitrary processing target pixel as the center and the restoration filter (the 7×7 deconvolution kernel and the calculation coefficient thereof) stored in advance in the memory or the like. The Y signal restoration processing section 227 performs the restoration processing of removing an image blur of the entire image by repeating the deconvolution processing for each pixel group of the predetermined unit so as to cover the entire area of the imaging surface. The restoration filter is determined in accordance with a position of the center of the pixel group to which the deconvolution processing is applied. That is, a common restoration filter is applied to adjacent pixel groups. In order to simplify the restoration processing further, it is preferable to apply a common restoration filter to all the pixel groups.

Figure 19:
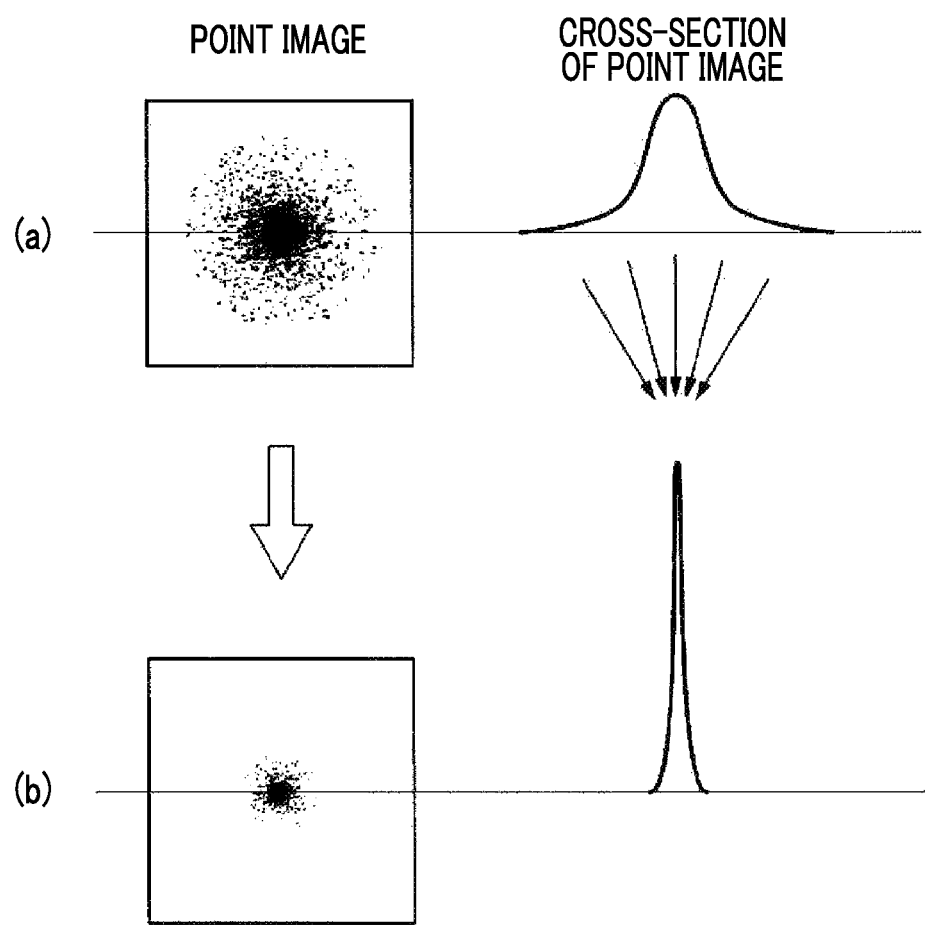
FIG. 19 is a diagram illustrating an example of restoration of the image which is acquired through the EDoF optical system, where (a) of FIG. 19 shows a blurred image which is not subjected to the restoration processing, and (b) of FIG. 19 shows an image (point image) in which blurring is eliminated after the restoration processing.

As shown in FIG. 19(a), a point image (optical image) of the luminance signals after passing through the EDoF optical system 210 is formed on the imaging element 212 as a large point image (blurred image), but is restored to a small point image (high resolution image) through the deconvolution processing in the Y signal restoration processing section 227 as shown in FIG. 19(b).

As described above, by applying the restoration processing to the luminance signals obtained after the demosaic processing, the need for having a parameter of the restoration processing separately for R, G and B is eliminated, and the restoration processing can be accelerated. Further, without gathering the R, G and B image signals corresponding to the R, G and B pixels at scattered positions into one unit respectively to perform the deconvolution processing, the luminance signals of adjacent pixels are gathered into the predetermined unit, the common restoration filter is applied to the unit and the deconvolution processing is performed, so that the accuracy of the restoration processing is improved. Furthermore, from the viewpoint of characteristics of vision by human eyes, the color difference signals Cr and Cb are allowed in terms of image quality without increasing a resolution through the restoration processing. In addition, in the case of recording the image in a compression format like JPEG the color difference signals are compressed with a higher compressibility than that for the luminance signals. Therefore, it is less necessary to increase the resolution through the restoration processing. In such a manner, the restoration accuracy can be improved and the processing can be simplified and accelerated compatibly.

The restoration processing according to the embodiments of the present invention can be applied even to the restoration of the EDoF system described above.

In the descriptions of the above-mentioned embodiments, the restoration processing section 36 is provided on the camera main body 14 (camera main body controller 28) of the digital camera 10. However, the restoration processing section 36 may be provided on another device such as a computer 60 or a server 80.

The above-mentioned digital camera 10 is just an example, and the present invention can be applied to other configurations as well. Each functional configuration can be appropriately implemented by arbitrary hardware, software, or a combination of both of them. For example, the present invention can also be applied to programs, which cause a computer to execute imaging methods (a processing step, and processing order) for the above-mentioned devices and processing sections (the camera main body controller 28, the image processing section 35, the restoration processing section 36, and the like), a computer-readable recording medium (non-transitory recording medium) onto which such programs are recorded, or various computers in which such programs are installed.

For example, when image data is processed in the computer 60, the restoration processing section installed in the computer 60 may perform processing of restoring the image data. Further, when the server 80 has the restoration processing section, for example, the image data is transmitted from the digital camera 10 or the computer 60 to the server 80, the restoration processing section of the server 80 performs the restoration processing on the image data, and the image data (restored image data) obtained after the restoration processing may be transmitted and provided to a transmission source. As described above, an image processing device, which has the restoration processing section provided in the computer 60, the server 80, or the like, may perform the restoration processing, and the computer 60, the server 80, or the like having the restoration processing section may perform all or a part of the restoration processing. Further, assuming that the restoration processing is performed outside the digital camera 10, the photography conditions acquired for each frame in a photography operation performed through the camera main body are recorded in the image data, and the image data acquired from the camera is transmitted to the image processing device, whereby the image processing device easily performs the restoration processing of the present invention. Furthermore, the photography conditions acquired for each frame in the photography operation performed through the camera main body are transmitted together with the image data to the image processing device, whereby the image processing device easily performs the restoration processing of the present invention. In addition, when the image processing device performs the restoration processing of the present invention, an image data acquisition section within the image processing device acquires the image data, an aperture value acquisition section within the image processing device acquires aperture values recorded in the image data, and the restoration processing of the present invention is executed. Further, it is preferable that the acquired or recorded photography conditions are acquired for each frame, but the present invention is not limited to this. In accordance with the tolerance of degradation in image quality caused by the restoration processing, the photography conditions are acquired once for several frames, or the photography conditions are acquired when a photography condition changes such that the condition becomes equal to or greater than a predetermined threshold value. In such a manner, acquisition of the photography conditions may be thinned out.

Further, embodiments, to which the present invention can be applied, are not limited to the digital camera 10, the computer 60 and the server 80. The present invention also can be applied to not only cameras that mainly have an imaging function but also mobile equipment that has not only the imaging function but also functions (a phone call function, a communication function, and other computer functions) other than the imaging function. Examples of the embodiments, to which the present invention can be applied, include a mobile phone having a camera function, a smartphone, a personal digital assistant (PDA), and a portable game machine. Hereinafter, an example of a smartphone, to which the present invention is applicable, will be described.

<Configuration of Smartphone>

Figure 20:
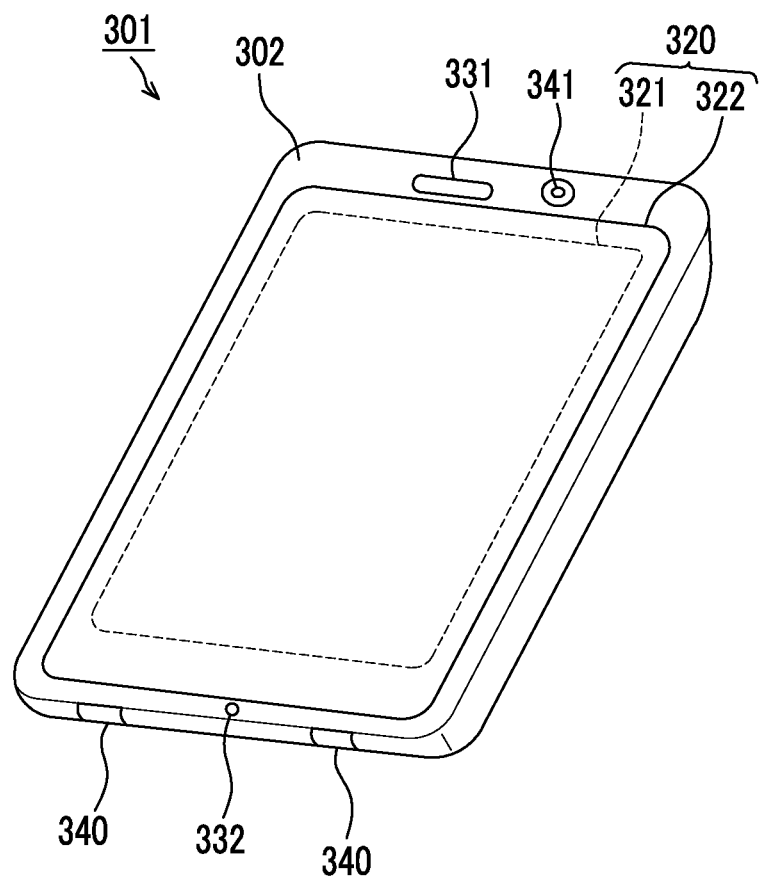
FIG. 20 is an external view of a smartphone.

FIG. 20 shows an appearance of a smartphone 301 as a photography apparatus according to the embodiment of the present invention. The smartphone 301 shown in FIG. 20 includes: a housing 302 that has a flat plate shape; a display panel 321 as a display section on one side of the housing 302; and a display input section 320 into which an operation panel 322 as an input section is integrated. Further, the housing 302 includes a speaker 331, a microphone 332, operation sections 340, and a camera section 341. In addition, the configuration of the housing 302 is not limited to this. For example, it may be possible to adopt a configuration in which the input section and the display section each are independent, or it may be possible to adopt a configuration having a slide mechanism or a folded structure.

Figure 21:
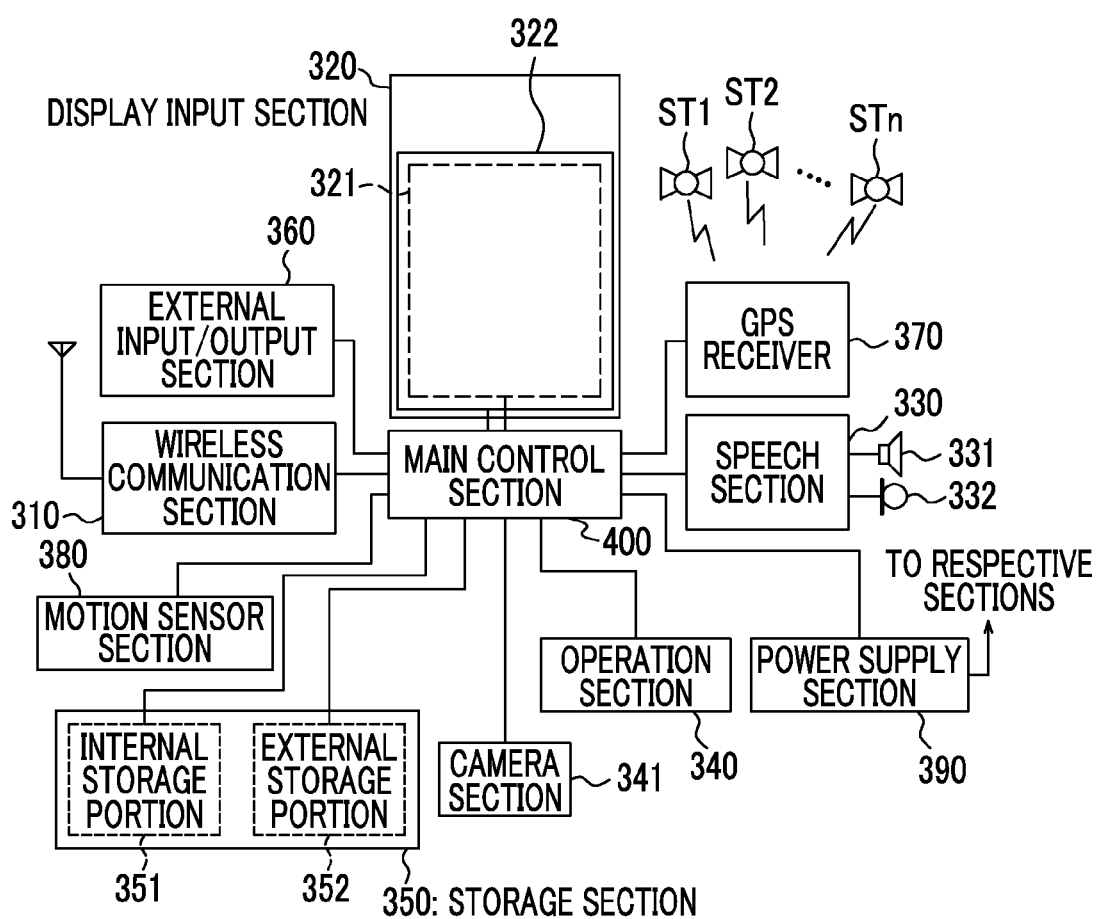
FIG. 21 is a block diagram illustrating a configuration of the smartphone shown in FIG. 20.

FIG. 21 is a block diagram illustrating a configuration of the smartphone 301 shown in FIG. 20. As shown in FIG. 21, the smartphone 301 includes, as main components, a wireless communication section 310, a display input section 320, a speech section 330, the operation sections 340, the camera section 341, a storage section 350, an external input/output section 360, a global positioning system (GPS) receiver 370, a motion sensor section 380, a power supply section 390, and a main control section 400. As the main function of the smartphone 301, there is provided a wireless communication function for performing mobile wireless communication with a base station device BS through a mobile communication network NW. In general, the above-mentioned image processing section 35 is configured to belong to the main control section 400, but the present invention is not limited to this.

The wireless communication section 310 performs wireless communication with the base station device BS, which is included in the mobile communication network NW, in accordance with an instruction of the main control section 400. Using this wireless communication, various kinds of file data such as audio data and image data, e-mail data, and the like are transmitted and received, and web data, streaming data, and the like are received.

The display input section 320 is a so-called touch panel, and includes the display panel 321 and the operation panel 322. The touch panel displays image (still image and moving image) information, text information, or the like so as to visually transfer the information to a user in accordance with control of the main control section 400, and detects a user operation on the displayed information.

The display panel 321 uses a liquid crystal display (LCD), an organic electro-luminescence display (OELD), or the like as a display device. The operation panel 322 is a device that is provided for viewing an image which is displayed on a display screen of the display panel 321 and that detects a single pair of coordinates or a plurality of pairs of coordinates at which an operation is performed by a user's finger or a stylus. When such a device is operated by a user's finger or a stylus, the device outputs a detection signal, which is generated due to the operation, to the main control section 400. Subsequently, the main control section 400 detects the coordinates as an operation position on the display panel 321, on the basis of the received detection signal.

As shown in FIG. 20, the display panel 321 and the operation panel 322 of the smartphone 301 exemplified as an embodiment of the photographing apparatus of the present invention are integrated to constitute the display input section 320. However, the operation panel 322 is disposed to completely cover the display panel 321. When this arrangement is adopted, the operation panel 322 may have a function of also detecting a user operation in a region outside the display panel 321. In other words, the operation panel 322 may include a detection region (hereinafter referred to as a display region) for a part which overlaps with the display panel 321 and a detection region (hereinafter referred to as a non-display region) for the other part at the outer edge which does not overlap with the display panel 321.

A size of the display region and a size of the display panel 321 may completely coincide with each other, but it is not always necessary for both to coincide with each other. Further, the operation panel 322 may include two sensing regions of the outer edge part and the other inside part. Furthermore, a width of the outer edge part is appropriately designed depending on a size of the housing 302 and the like. In addition, examples of the position detection method adopted by the operation panel 322 may include a matrix switch method, a resistance film method, a surface elastic wave method, an infrared method, an electromagnetic induction method, and an electrostatic capacitance method, and the like, and any method may be adopted.

The speech section 330 includes a speaker 331 and a microphone 332. The speech section 330 is able to convert a sound of a user, which is input through the microphone 332, into sound data, which can be processed in the main control section 400, and output the data to the main control section 400, and decodes sound data, which is received by the wireless communication section 310 or the external input/output section 360, and outputs the data from the speaker 331. Further, as shown in FIG. 20, for example, the speaker 331 can be mounted on the same surface as the surface on which the display input section 320 is provided. In addition, the microphone 332 can be mounted on a side surface of the housing 302.

The operation section 340 is a hardware key using a key switch or the like, and receives an instruction from a user. For example, as shown in FIG. 20, the operation sections 340 are button type switches which are mounted on the side surface of the housing 302 of the smartphone 301. Each switch is turned on if it is pressed by a finger or the like, and is turned off due to a restoring force of a spring if the finger is released.

The storage section 350 stores a control program and control data of the main control section 400, application software, address data in which names, phone numbers, and the like of communication partners are associated, received and transmitted e-mail data, web data which is downloaded by web browsing, and downloaded contents data, and temporarily stores streaming data and the like. Further, the storage section 350 is constituted of an internal storage portion 351, which is built into the smartphone, and an external storage portion 352 which has a removable external memory slot. In addition, each of the internal storage portion 351 and the external storage portion 352 constituting the storage section 350 is implemented by using a storage medium such as a flash memory type, a hard disk type, a multimedia card micro type, a card type memory (such as a Micro SD (registered trademark) memory), a random access memory (RAM), or a read only memory (ROM).

The external input/output section 360 has a function of an interface with all external devices connected to the smartphone 301. The external input/output section 360 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultrawideband (UWB) (registered trademark), and ZigBee (registered trademark)), or the like.

Examples of the external devices connected to the smartphone 301 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, a PDA which is connected in a wired or wireless manner, earphones, and the like. The external input/output section is able to transfer the data, which is transmitted from such external devices, to the components within the smartphone 301, and to transmit the data within the smartphone 301 to the external devices.

The GPS receiver 370 receives a plurality of GPS signals, which are transmitted from GPS satellites ST1 to STn, in accordance with instructions of the main control section 400, executes positioning calculation processing based on the received GPS signals, and detects a position formed of a latitude, a longitude, and an altitude of the smartphone 301. The GPS receiver 370 may detect the position by using position information when it is possible to acquire the position information from the wireless communication section 310 or the external input/output section 360 (for example, wireless LAN).

The motion sensor section 380 includes, for example, a triaxial acceleration sensor, and detects physical movement of the smartphone 301, in accordance with an instruction of the main control section 400. By detecting physical movement of the smartphone 301, an acceleration and a direction of the movement of the smartphone 301 are detected. Such a detection result is output to the main control section 400.

The power supply section 390 supplies the respective sections of the smartphone 301 with electric power, which is stored in a battery (not shown), in accordance with an instruction of the main control section 400.

The main control section 400 includes a microprocessor, and integrally controls the respective sections of the smartphone 301 by performing an operation on the basis of control data or a control program stored in the storage section 350. Further, the main control section 400 has an application processing function and a mobile communication control function of controlling the respective sections of a communication system in order to perform data communication and sound communication through the wireless communication section 310.

The application processing function is implemented by an operation of the main control section 400 using application software stored in the storage section 350. Examples of the application processing function include: an infrared communication function of performing data communication with other devices by controlling the external input/output section 360; an e-mail function of transmitting and receiving e-mails; a web browsing function of browsing web pages; and the like.

Further, the main control section 400 has an image processing function of displaying a video on the display input section 320 and the like, on the basis of image data (still image and moving image data) such as received data and downloaded streaming data. The image processing function means a function of causing the main control section 400 to decode the image data, apply image processing to the corresponding decoding result, and display an image on the display input section 320.

Further, the main control section 400 executes display control for the display panel 321 and operation detection control to detect the user operation through the operation sections 340 and the operation panel 322.

Through execution of the display control, the main control section 400 displays an icon for activating application software and a window for displaying a software key such as a scroll bar or creating an e-mail. It should be noted that the scroll bar means a software key for receiving an instruction to move a display portion of an image on a large image which cannot be entirely shown in the display region of the display panel 321.

Further, through execution of the operation detection control, the main control section 400 detects the user operation performed through the operation section 340, receives an operation performed on the icon or a text input performed in an input field of the window through the operation panel 322, or receives a request to scroll a displayed image through the scroll bar.

Furthermore, the main control section 400 has a touch panel control function performed through execution of the operation detection control. The function determines whether the operation position of the operation panel 322 is in the overlapping part (display region) which overlaps with the display panel 321 or the other part (non-display region) at the outer edge which does not overlap with the display panel 321, and controls the display position of the software key or the sensing region of the operation panel 322.

In addition, the main control section 400 may detect a gesture operation performed on the operation panel 322, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 341 is a digital camera for performing electronic photography by using the imaging element such as a complementary metal oxide semiconductor (CMOS) or a charge-coupled device (CCD). Further, the camera section 341 is able to convert image data, which is obtained through image capturing, into compressed image data such as data of a joint photographic coding experts group (JPEG) under control of the main control section 400, and to record the data in the storage section 350 or to output the data through the external input/output section 360 or the wireless communication section 310. As shown in FIG. 20, in the smartphone 301, the camera section 341 is mounted on the same side as the display input section 320. However, the mounting position of the camera section 341 is not limited to this. The camera section 341 may be mounted on the rear side of the display input section 320, or a plurality of camera sections 341 may be mounted. In addition, in the case where a plurality of camera sections 341 is mounted, photography may be performed using a single camera section 341 by selecting the camera section 341 for the photography, or photography may be performed using the plurality of camera sections 341 at the same time.

Further, the camera section 341 can be used in various functions of the smartphone 301. For example, an image, which is acquired by the camera section 341, can be displayed on the display panel 321, and an image of the camera section 341 as one of the operation inputs of the operation panel 322 can be used. Further, when the GPS receiver 370 detects a position, the GPS receiver 370 may detect the position with reference to the image acquired from the camera section 341. Furthermore, it may be possible to determine a direction of an optical axis of the camera section 341 of the smartphone 301 or determine a current user environment, using the GPS receiver 370 in a combination with the triaxial acceleration sensor or without using the triaxial acceleration sensor, with reference to the image acquired from the camera section 341. Needless to say, the image acquired from the camera section 341 may be used in the application software.

Otherwise, the position information acquired by the GPS receiver 370, the sound information acquired by the microphone 332 (or text information obtained through sound text conversion performed by the main control section or the like), the posture information acquired by the motion sensor section 380, and the like may be added to the image data of the still image or the moving image, and the image data may be recorded in the storage section 350, and may be output through the external input/output section 360 or the wireless communication section 310.

It is apparent that the present invention is not limited to the above-mentioned embodiments, and may be modified into various forms without departing from the scope of the present invention.

EXPLANATION OF REFERENCES

10: digital camera
11: imaging section
12: optical system
14: camera main body
16: lens
17: diaphragm
18: optical system operation section
20: optical system controller
22: optical system input/output section
26: imaging element
28: camera main body controller
30: camera main body input/output section
32: input/output interface
33: display section
34: device control section
35: image processing section
36: restoration processing section
37: user interface
60: computer
62: computer input/output section
64: computer controller
66: display 70: Internet
80: server
82: server input/output section
84: server controller
100: image generation section
105: filter acquisition section
110: aperture value detection section
115: restoration processing determination section
120: restoration processing execution section
201: imaging module
210: EDoF optical system
210A: photography lens
211: optical filter
212: imaging element
214: AD conversion section
220: restoration processing block
222: black level adjustment section
223: white balance gain section
224: gamma processing section
225: demosaic processing section
226: conversion section
227: Y signal restoration processing section
301: smartphone
302: housing
310: wireless communication section
320: display input section
321: display panel
322: operation panel
330: speech section
331: speaker
332: microphone
340: operation section
341: camera section
350: storage section
351: internal storage portion
352: external storage portion
360: external input/output section
370: GPS receiver
380: motion sensor section
390: power supply section
400: main control section

What is claimed is:

1. An imaging device comprising:
an imaging section that captures an image of a subject through an optical system and generates image data;
an image generation section that generates a moving image subjected to thinning-out processing on the basis of the image data;
a filter acquisition section that acquires a restoration filter corresponding to a transfer function for point distribution of the optical system;
an aperture value detection section that detects an aperture value of the optical system when the imaging section captures the image of the subject;
a restoration processing determination section that determines whether or not the aperture value detected by the aperture value detection section is a distortion-suppression aperture value corresponding to small-aperture blurring which suppresses aliasing distortion caused when the thinning-out processing is performed; and
a restoration processing execution section that executes a restoration processing on the moving image, which is subjected to the thinning-out processing, through the restoration filter, in case where the restoration processing determination section determines that the aperture value detected by the aperture value detection section is the distortion-suppression aperture value.

2. The imaging device according to claim 1, wherein the restoration processing execution section adjusts a restoration strength of the restoration processing in accordance with the aperture value detected by the aperture value detection section, and executes the restoration processing.

3. The imaging device according to claim 1,
wherein the image generation section further generates a still image on the basis of the image data,
wherein in case where determining whether or not to perform the restoration processing on the still image, the restoration processing determination section determines whether or not to perform the restoration processing on the still image, on the basis of a still-image reference aperture value as an aperture value which is less than the distortion-suppression aperture value closest to an open side among the distortion-suppression aperture values, and
wherein the restoration processing execution section executes the restoration processing on the still image through the restoration filter in case where the restoration processing determination section determines that the aperture value detected by the aperture value detection section is equal to or greater than the still-image reference aperture value.

4. The imaging device according to claim 3, wherein in case where performing the restoration processing on the moving image, the restoration processing execution section performs the restoration processing by adjusting the restoration strength of the restoration processing to a strength lower than that in the case where the restoration processing is performed on the still image.

5. The imaging device according to claim 4,
wherein the filter acquisition section acquires a restoration filter for the moving image in case where the restoration processing is performed on the moving image, and acquires a restoration filter for the still image in case where the restoration processing is performed on the still image, and
wherein the restoration processing execution section executes the restoration processing through the restoration filter for the moving image in case where performing the restoration processing on the moving image, and executes the restoration processing through the restoration filter for the still image in case where performing the restoration processing on the still image.

6. The imaging device according to claim 4,
wherein the filter acquisition section acquires a restoration filter for the still image in case where the restoration processing is performed on the moving image, and acquires a restoration filter for the still image in case where the restoration processing is performed on the still image, and
wherein the restoration processing execution section executes the restoration processing through the restoration filter for the still image in case where performing the restoration processing on the moving image, and executes the restoration processing through the restoration filter for the still image in case where performing the restoration processing on the still image.

7. The imaging device according to claim 5, wherein a filter size of the restoration filter for the moving image is smaller than a filter size of the restoration filter for the still image.

8. The imaging device according to claim 1, wherein the restoration processing execution section performs the restoration processing of correcting only an amplitude component of the transfer function for the point distribution of the optical system in case where the restoration processing is performed on the moving image.

9. The imaging device according to claim 1, wherein the aperture value detection section detects the aperture value on the basis of a luminance which is obtained from the moving image at beginning of capturing the image of the subject through the imaging section.

10. The imaging device according to claim 9, wherein the filter acquisition section acquires a restoration filter which is generated corresponding to the transfer function for the point distribution of the optical system, on the basis of an aperture value which is closer to a small-aperture side than the aperture value detected by the aperture value detection section.

11. The imaging device according to claim 1, wherein the restoration processing execution section executes the restoration processing after the subject is brought into focus at the beginning of generating the moving image through the imaging section.

12. The imaging device according to claim 1, wherein the optical system has an interchangeable lens.

13. The imaging device according to claim 1, wherein the optical system has a lens that extends a depth of field by modulating a phase.

14. An imaging method using the imaging device according to claim 1 comprising:
   an imaging step of capturing an image of a subject through an optical system and generating image data;
   an image generation step of generating a moving image subjected to thinning-out processing on the basis of the image data;
   a filter acquisition step of acquiring a restoration filter corresponding to a transfer function for point distribution of the optical system;
   an aperture value detection step of detecting an aperture value of the optical system in case where the image of the subject is captured in the imaging step;
   a restoration processing determination step of determining whether or not the aperture value detected in the aperture value detection step is a distortion-suppression aperture value corresponding to small-aperture blurring which suppresses aliasing distortion caused in case where the thinning-out processing is performed; and
   a restoration processing execution step of executing a restoration processing on the moving image, which is subjected to the thinning-out processing, through the restoration filter, in case where it is determined through the restoration processing determination step that the aperture value detected in the aperture value detection step is the distortion-suppression aperture value.

15. An imaging device comprising:
   an optical system that captures an image of a subject;
   an imaging element that generates image data of the subject;
   an image generation circuit that generates a moving image subjected to thinning-out processing on the basis of the image data;
   a filter acquisition circuit that acquires a restoration filter corresponding to a transfer function for point distribution of the optical system;
   an aperture value detection circuit that detects an aperture value of the optical system when the image of the subject is captured;
   a restoration processing determination circuit that determines whether or not the aperture value detected by the aperture value detection circuit is a distortion-suppression aperture value corresponding to small-aperture blurring which suppresses aliasing distortion caused when the thinning-out processing is performed; and
   a restoration processing execution circuit that executes a restoration processing on the moving image, which is subjected to the thinning-out processing, through the restoration filter, in case where the restoration processing determination circuit determines that the aperture value detected by the aperture value detection circuit is the distortion-suppression aperture value.

* * * * *